United States Patent Office 3,179,692
Patented Apr. 20, 1965

3,179,692
HEXACYANO-2-BUTENE ACIDS AND SALTS AND PREPARATION THEREOF
Elmore L. Martin, Wilmington, Del., assignor to E. I. du Pont de Nemours and Company, Wilmington, Del., a corporation of Delaware
No Drawing. Filed Mar. 20, 1962, Ser. No. 181,179
14 Claims. (Cl. 260—465)

This invention is concerned with a new class of cyano-containing organic compounds and a process for their preparation. More particularly, it concerns 4-substituted-1,1,2,3,4,4-hexacyano-2-butene acids and salts, and their preparation.

The discovery of tetracyanoethylene has proved to be a great stimulus to the study of cyano-containing compounds because of the unexpected chemical activity it was found to possess. The large number of new compounds derived directly from tetracyanoethylene by reaction with common chemical compounds has opened the whole field of cyanocarbon chemistry and made it desirable to search for other cyano-containing compounds not directly derived from tetracyanoethylene. Many such compounds have already been found. For example, it has recently been shown that alkali or alkaline earth metal derivatives of monosubstituted malononitriles react readily with 1,2-dihalo-1,2-dicyanoethylenes to yield 1,4-disubstituted 2-butenehexacarbonitriles.

It has now been discovered that selected 1,4-disubstituted 2-butenehexacarbonitriles are proto acids (i.e., acid precursors) which decompose on heating to yield the 4-substituted-1,1,2,3,4,4-hexacyano-2-butenes, a new class of strong organic acids. The 4-substituted-1,1,2,3,4,4-hexacyano-2-butenide salts which are readily formed from these acids are also embraced in the invention.

The process and acid products of this invention may be illustrated by the following two equations:

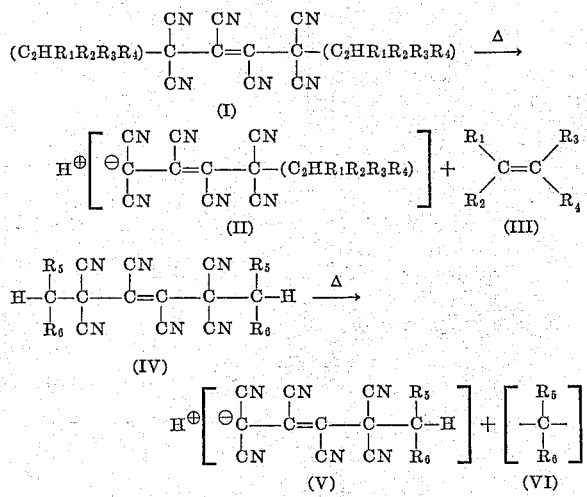

where $R_1$, $R_2$, $R_3$, and $R_4$ may be alike or different and may be hydrogen, hydrocarbyl, or substituted hydrocarbyl in which the substituents are amino, hydroxy, cyano, halo, nitro, hydrocarbyloxysulfonyl, hydrocarbyloxy, or hydrocarbyloxycarbonyl, and $R_5$ and $R_6$ may be alike or different and may be carbocyclic aryl or substituted carbocyclic aryl in which the substituents may be amino, hydroxy, cyano, halo, nitro, hydrocarbyloxysulfonyl, hydrocarbyloxy, or hydrocarbyloxycarbonyl. In the ($C_2HR_1R_2R_3R_4$) group, the hydrogen may be attached to either of the two indicated carbon atoms. It is essential for the process of the invention that hydrogen be available on at least one of these carbon atoms.

"Hydrocarbyl" is used in its accepted meaning as representing a radical having a structure identical to that formed from a hydrocarbon by removal of a hydrogen atom. The hydrocarbyl groups represented by $R_1$, $R_2$, $R_3$, and $R_4$ in the formulas above may be any radical composed solely of carbon and hydrogen. "Hydrocarbyl" is used in its full generic sense. The wide variation in the hydrocarbyl groups used in the illustrations which follow makes it evident that all hydrocarbyl groups are operable. Hydrocarbyl groups may vary as to whether they are alkyl, cycloalkyl, aryl, aralkyl, alkaryl, single ring, multi ring aliphatically saturated, aliphatically unsaturated, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process. Representative hydrocarbyl groups include methyl, ethyl, tert-butyl, isooctyl, dodecyl, octadecyl, eicosyl, vinyl, ethynyl, propargyl, 9,10-octadecenyl, 9,10-octadecynyl, butadienyl, 9,12-octadecadienyl, cyclopropyl, cyclobutyl, cyclohexyl, cyclooctyl, phenyl, naphthyl, anthryl, rubryl, benzyl, phenethyl, duryl, 4-isopropylnaphthyl, chrysyl, and the like.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that hydrocarbyl groups containing 20 or fewer carbon atoms are most available, and to that extent preferred. But there is to be no question of the operability of, or of the intent to include and disclose, any hydrocarbyl group whatsoever.

In the above formulas, the groups particularly preferred for $R_1$, $R_2$, $R_3$, and $R_4$ because of their ready availability through synthetic routes include alkyl including aliphatically mono- and polyunsaturated alkyl with up to and including 18 carbon atoms; cycloalkyl with three to ten carbon atoms (as in cyclopropyl, cyclohexyl, and camphyl); aralkyl with 7 to 19 carbon atoms (as in benzyl and triphenylmethyl); and aryl with up to and including 18 carbon atoms (as in phenyl, naphthyl, anthryl, furyl, thienyl, pyrrolyl, quinolyl, anthraquinolyl, dibenzofuryl, and benzanthryl), as well as substituted derivatives of these alkyl, cycloalkyl, aralkyl, and aryl groups carrying one or more substituents such as hydroxy, lower alkoxy, benzyloxy, aryloxy in which the aryl groups have up to 12 carbon atoms (as in phenyl, tolyl, naphthyl, and anthryl), lower alkyl, lower alkylsulfonyl, hydroxy lower alkylsulfonyl, benzylsulfonyl, arylsulfonyl in which the aryl groups have up to 12 carbon atoms (as in phenyl, tolyl, naphthyl, and anthryl), formyl, cyano, halogen (as in fluoro, chloro, bromo, and iodo), amino, dilower alkylamino, diphenylamino, dibenzylamino acylamino in which the acyl groups contain up to seven carbon atoms (as in acetyl, butyroyl, and benzoyl), carboxy, lower alkoxycarbonyl, and nitro.

The by-products of the reaction of this invention are olefins or other substances that can be regarded as being derived from diarylcarbenes and depend on the structure of the starting materials.

It can be postulated that a carbene is formed as a transient intermediate in the second equation because this is a reasonable way to explain the by-products actually isolated, but other explanations are possible. Under strictly anhydrous conditions, two units of the postulated carbene

can be visualized as uniting to give an ethylene structure $CR_5R_6=CR_5R_6$. However, if even traces of moisture are present, the carbene presumably reacts preferentially with the water to form an ether, $CHR_5R_6-O-CHR_5R_6$, or simultaneously abstracts hydrogen from water or a solvent to form a disubstituted methane, $CH_2R_5R_6$, and a disubstituted methanol, $CHOHR_5R_6$.

The process of this invention requires only that the selected 1,4-disubstituted 2-butenehexacarbonitrile as defined above be heated above its decomposition temperature. Temperatures in the range from $-80$ to $+250°$ C. are operable and those in the range from $-40°$ C. to $+200°$ C. are preferred. Where the decomposition temperature of the selected 1,4-disubstituted 2-butenehexacarbonitrile is below room temperature, the process of the invention is accomplished readily by permitting the butene to approach room temperature spontaneously by heat exchange with the atmosphere. External heating by any conventional means may be employed at these low temperatures, as well as at room temperature and above, to bring about the reaction of the invention.

In a preferred embodiment of this invention, one of the proto acids of Formula I or IV, which has a decomposition temperature above room temperature, is heated above its decomposition temperature to yield the free acid.

No added materials of any kind are required for carrying out the process of this invention. To control the rate of heat exchange and hence the rate of the reaction, it is convenient, though not essential, to conduct the reaction in a liquid medium which is inert to the starting materials and products. Suitable media include water, alcohols such as methanol, ethanol, and butanol; ketones such as acetone and methyl ethyl ketone; ethers such as diethyl ether and tetrahydrofuran; and dialkylamides such as dimethylformamide and diethylacetamide.

Pressure is not a critical factor in the process of this invention. Pressures above and below atmospheric pressure are operable and atmospheric pressure is preferred for convenience and economy.

The 4-substituted hexacyano-2-butenide salt products of this invention are those having the formulas

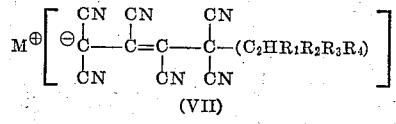

and

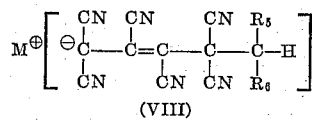

in which the R's are as defined above and M is one equivalent of a cation. Thus, M may be hydrogen, one equivalent of a metal ion, an ammonium ion, a hydrocarbyl substituted ammonium ion, and the like. By metal is meant an element having an atomic number of 3, 4, 11–13, 19–32, 37–51, 55–84, 87–101, and above. The invention thus embraces the free acid forms of these compounds and their salts.

The salts are readily prepared from the free acids of Formulas II and V by reaction with oxides, bases, and other salts. Thus, the acids react with metal oxides or hydroxides, as well as with amines, and the like under any of a wide variety of reaction conditions including ordinary conditions of temperature and pressure, e.g., room temperature and atmospheric pressure, to yield the corresponding metallic and onium salts. The salts may be converted in turn to other salts by metathesis. For example, acid of Formulas II and V react readily with barium oxide or barium hydroxide to yield the corresponding barium salts. Aqueous solutions of these salts are useful for preparing other salts of these acids by reacting with aqueous solutions of the corresponding sulfates. In such a reaction, barium sulfate is precipitated quantitatively as a by-product and is readily filtered off, leaving a solution of the salt of the cation which was introduced in the form of a sulfate. In this way, compounds of Formulas VII and VIII, where M is one equivalent of barium, react with aqueous solutions of the sulfates of $Al^{+++}$, $Ce^{+++}$, $Cs^+$, $Cr^{++}$, $Cr^{+++}$, $Co^{++}$, $Co^{+++}$, $Cu^{++}$, $Fe^{++}$, $Fe^{+++}$, $Ga^{+++}$, $In^{+++}$, $Ni^{++}$, $Li^+$, $K^+$, $Mn^{++}$, $Rb^+$, $Sn^{++}$, $Sn^{++++}$, $Th^{++++}$, $UO_2^{++}$, $VO^+$, $Zn^{++}$, $Zr^{++++}$, $NH_4^+$, $C_6H_5NH_3^+$, $(C_2H_5)_2NH_2^+$, and $(CH_3)_3NH^+$, to yield the corresponding metal or ammonium.

In generic formulas shown above for the salt product of this invention (VII and VIII), the convention has been adopted of expressing the charge on the anion as associated with the unsubstituted terminal carbon atom of the hexacyano-2-butene group. It should be recognized that these ions are resonant structures and that the charge might be visualized as associated with other atoms in the molecule.

Th 4-substituted 1,1,2,3,4,4-hexacyano-2-butenides of Formulas VII and VIII are readily converted to the corresponding 1,1,2,3,4,4-hexacyano-2-butenediide by treatment with an alkali metal derivative of an active methylene compound. In this reaction the $-(C_2HR_1R_2R_3R_4)$ and

groups of compounds of Formulas VII and VIII respectively are replaced by a cation other than hydrogen. Thus the sodium or tetramethylammonium salts of 5-(p-methoxyphenyl)-1,1,2,3,4,4-hexacyano-2-hexenide react with sodiomalononitrile or the sodio derivative of ethyl cyanoacetate to yield disodium 1,1,2,3,4,4-hexacyano-2-butenediide.

Th examples which follow serve to illustrate the invention disclosed but should not be regarded as limiting it for obvious modifications will be within the knowledge of one skilled in the art. Parts are by weight unless otherwise indicated.

EXAMPLE I

*Part A.—2,7-dibenzyl-2,7-dimethyl-4-octene-3,3,4,5,6,6-hexacarbonitrile*

A solution of sodium α,α-dimethyl-β-phenylethylmalononitrile is prepared from 24 parts of sodium hydride and 192 parts of α,α-dimethyl-β-phenylethylmalononitrile in tetrahydrofuran at 0° C. The resulting solution is added slowly to a solution of 73 parts of dichlorofumaronitrile in 444 parts of tetrahydrofuran at $-40°$ C. The resulting deep red reaction mixture is warmed to room temperature, and most of the tetrahydrofuran is removed by distillation under vacuum at 25° C. The residue is washed in turn with water, methanol, acetone, and ether. There is obtained 188 parts of 2,7-dibenzyl - 2,7 - dimethyl-4-octene-3,3,4,5,6,6-hexacarbonitrile in the form of a colorless powder melting at 157–158° C.

*Part B.—Tetramethylammonium 1,1,2,3,4,4-hexacyano-5-benzyl-5-methyl-2-hexenide*

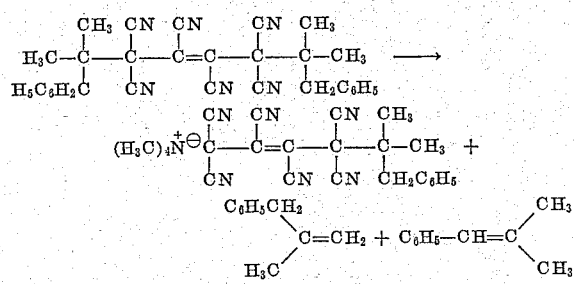

A mixture of 47 parts of 2,7-dibenzyl-2,7-dimethyl-4-octene-3,3,4,5,6,6-hexacarbonitrile and 473 parts of dimethylformamide is heated at 80–100° C. for five minutes. The dimethylformamide and other volatiles are removed by distillation under reduced pressure at 50–55° C. leaving the free acid 5-benzyl-1,1,2,3,4,4-hexacyano-5-methyl-2-hexene as a brown residue. The brown residue is dissolved in water and 20% aqueous tetramethylammonium chloride is added. The resulting precipitated solid is collected and washed with a small volume of cold water. Recrystallization from methanol gives 38 parts (92% yield) of tetramethylammonium 1,1,2,3,4,4-hexacyano-5-benzyl-5-methyl-2-hexenide in the form of bright yellow crystals, melting at 170–172° C. Two additional recrystallizations give bright yellow crystals, M.P. 171–172° C.

$$\lambda_{max.}^{CH_3OH} = 415 \ m\mu \ (\epsilon = 17,100)$$

The dimethylformamide distillates are diluted with a large volume of water and the resulting solution is extracted several times with petroleum ether. The petroleum ether extracts are concentrated by evaporation and the residue is distilled, B.P. 52° C./7 mm.; $n_D^{25} = 1.5140$ $$\lambda_{max.}^{EtOH} = 245 \ m\mu$$

$k = 26.3$. The low values for the refractive index and $k$ suggest that the product is a mixture. Gas phase chromatography analysis indicates that the material contains 21% of β,β-dimethylstyrene and 79% of 1-benzyl-1-methylethylene.

*Analysis.*—Calcd. for $C_{24}H_{25}N_7$: C, 70.05; H, 6.12; N, 23.83. Found: C, 69.99; H, 6.04; N, 23.36.

EXAMPLE II

*Part A.—2,2,7,7-tetramethyl-4-octene-3,3,4,5,6,6-hexacarbonitrile*

A solution of sodium tert-butylmalononitrile is prepared from 72 parts of sodium hydride, 366 parts of tert-butylmalononitrile, and 1776 parts of tetrahydrofuran. This solution is added slowly to a solution of 260 parts of dichlorofumaronitrile in 2220 parts of tetrahydrofuran at −70° C. The reaction mixture is warmed to 20° C., and most of the tetrahydrofuran is removed by distillation under vacuum at that temperature. The residue is washed in turn with water, methanol, and petroleum ether. The resulting nearly colorless powder weighs about 420 parts. Four recrystallizations from acetone/water give 2,2,7,7-tetramethyl-4-octene-3,3,4,5,6,6-hexacarbonitrile in the form of colorless crystals melting at 155–156° C.

*Part B.—Tetramethylammonium 1,1,2,3,4,4-hexacyano-5,5-dimethyl-2-hexenide*

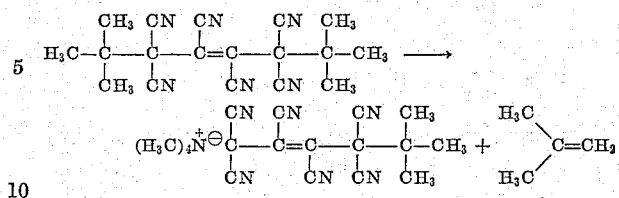

A suspension of 200 parts of 2,2,7,7-tetramethyl-4-octene - 3,3,4,5,6,6 - hexacarbonitrile in 709 parts of dimethylformamide in a glass reactor fitted with a tube leading to receiver cooled at −78° C. is stirred and heated at 80–100° C. until a homogeneous solution is obtained and the evolution of gas ceases. The gas collected in the receiver boils at about 0° C. and the IR spectrum indicates the gas to be pure isobutylene. The dimethylformamide is removed by distillation under reduced pressure at 50–55° C. The residue of 1,1,2,3,4,4-hexacyano-5,5-dimethyl-2-hexene is dissolved in 500 parts of water and a chemical excess of 20% aqueous tetramethylammonium chloride is added slowly with stirring. The bright yellow crystals which separate are collected, washed with cold 2% tetramethylammonium chloride, then washed with a small amount of cold water, cold methanol, and finally with ether. The yield of bright yellow crystals melting at 229–230° C. is 170 parts (81% yield). Three additional crystallizations from methanol give bright yellow crystals of tetramethylammonium 1,1,2,3,4,4-hexacyano-5,5-dimethyl-2-hexenide, M.P. 229–230° C.

$$\lambda_{max.}^{CH_3OH} = 415 \ m\mu \ (\epsilon = 13,800)$$

*Analysis.*—Calcd. for $C_{18}H_{21}N_7$: C, 64.46; H, 6.31; N, 29.24. Found: C, 64.82; H, 6.38; N, 29.38.

EXAMPLE III

*Tetraethylammonium 1,1,2,3,4,4-hexacyano-5,5-dimethyl-2-hexenide*

A suspension of 50 parts of 2,2,7,7-tetramethyl-4-octene-3,3,4,5,6,6-hexacarbonitrile in 236 parts of dimethylformamide is heated at 80–100° C. for three minutes. The dimethylformamide is distilled off under reduced pressure and the residue of 1,1,2,3,4,4-hexacyano-5,5-dimethyl-2-hexene is dissolved in water and a molar excess of 20% aqueous tetraethylammonium bromide is added. The tetraethylammonium 1,1,2,3,4,4-hexacyano - 5,5 - dimethyl-2-hexenide is collected, washed with 2% tetraethylammonium bromide and a small volume of cold water. The yield is 50 parts (81% yield), M.P. 128–130° C. Three recrystallizations from aqueous methanol give bright yellow crystals, M.P. 129–130° C.

$$\lambda_{max.}^{CH_3OH} = 415 \ m\mu \ (\epsilon = 21,800)$$

*Analysis.*—Calcd. for $C_{22}H_{29}N_7$: C, 67.49; H, 7.47; N, 25.05. Found: C, 67.14; H, 7.35; N, 24.97.

EXAMPLE IV

*Part A.—2,7-diphenyl-4-octene-3,3,4,5,6,6-hexacarbonitrile*

To a mixture of 72 parts of sodium hydride in 1776 parts of tetrahydrofuran, 510 parts of α-methylbenzylmalononitrile is added slowly to obtain a solution of sodium α-methylbenzylmalononitrile. This solution is added slowly to a stirred solution of 233 parts of dichlorofumaronitrile in 1776 parts of tetrahydrofuran cooled to −60° C. The thick reaction mixture is allowed to warm to room temperature, and the tetrahydrofuran is removed by distillation under vacuum. The residue is washed with water, methanol, acetone, and ether. There is obtained 325 parts of 2,7-diphenyl-4-octene-3,3,4,5,6,6-hexacarbonitrile in the form of colorless crystals. The material is recrystallized three times by dissolving in acetone and precipitating by the slow addition of water to obtain crystals melting at 148–149° C.

Part B.—*Tetramethylammonium 1,1,2,3,4,4-hexacyano-5-phenyl-2-hexenide*

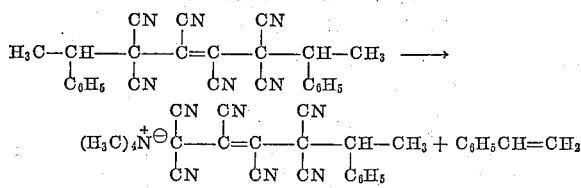

A mixture of 50 parts of 2,7-diphenyl-4-octene-3,3,4,5,6,6-hexacarbonitrile and 284 parts of dimethylformamide is heated at 70–75° C. for 10 minutes. The dimethylformamide is removed by distillation under reduced pressure at 45–50° C. The residue of 1,1,2,3,4,4-hexacyano-5-phenyl-2-hexene is dissolved in water and the solution is neutralized with sodium bicarbonate. A small amount of gummy material is recovered by filtration and 200 parts of tetramethylammonium chloride is added to the filtrate. A gum separates that solidifies on stirring with a small volume of methanol. Crystallization from methanol gives 30 parts (65% yield) of tetramethylammonium 1,1,2,3,4,4-hexacyano-5-phenyl-2-hexenide in the form of yellow crystals, M.P. 156–157° C. Six crystallizations from methanol give crystals melting at 157–158° C. The molecular extinction coefficients in methanol at 420, 402, and 245 m$\mu$ are 16,500, 17,300, and 5,500 respectively. The dimethylformamide distillates are diluted with water and extracted with petroleum ether. Concentration of the petroleum ether and distillation of the residue gives styrene, identified by UV absorption at 282, 246, and 215 m$\mu$ and by the melting point and mixed melting point, 74–75° C., of the dibromide.

*Analysis.*—Calcd. for $C_{22}H_{21}N_7$: C, 68.91; H, 5.52; N, 25.57. Found: C, 69.13; H, 5.81; N, 25.73.

EXAMPLE V

*Part A.—2,7-dimethyl-2,7-diphenyl-4-octene-3,3,4,5,6,6-hexacarbonitrile*

A solution of sodium $\alpha,\alpha$-dimethylbenzylmalononitrile is prepared in the manner of Part A of Example IV using 72 parts of sodium hydride and 582 parts of $\alpha,\alpha$-dimethylbenzylmalononitrile in tetrahydrofuran. The resulting solution is added to a solution of 231 parts of dichlorofumaronitrile in 1776 parts of tetrahydrofuran at $-60°$ C. to obtain a solution of 2,7-dimethyl-2,7-diphenyl-4-octene-3,3,4,5,6,6-hexacarbonitrile.

*Part B.—Tetramethylammonium 1,1,2,3,4,4-hexacyano-5-methyl-5-phenyl-2-hexenide*

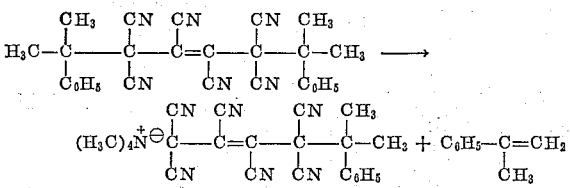

The solution of 2,7-dimethyl-2,7-diphenyl-4-octene-3,3,4,5,6,6-hexacarbonitrile from Part A is allowed to warm to room temperature and most of the tetrahydrofuran is distilled off under reduced pressure. The residue of 1,1,2,3,4,4-hexacyano-5-methyl-5-phenyl-2-hexene is treated with water, the reaction mixture is neutralized with sodium bicarbonate and solid tetramethylammonium chloride is added. A dark colored gum separates that is stirred with a small volume of acetone, whereupon a solid is obtained. The solid is collected, dissolved in acetone, and precipitated by the addition of 20% aqueous tetramethylammonium chloride. Two crystallizations from acetone give 152 parts (26% yield) of tetramethylammonium 1,1,2,3,4,4 - hexacyano - 5 - methyl - 5 - phenyl-2-hexenide in the form of bright yellow crystals, M.P. 178–179° C. Two additional crystallizations from acetone-methanol give bright yellow crystals, M.P. 178–179° C.;

$$\lambda_{max.}^{CH_3OH} = 415 \text{ m}\mu \ (\epsilon = 16,400)$$

The various filtrates are combined, diluted with water, and extracted with petroleum ether. After concentration, the residue is distilled and the fraction boiling at 60° C./17 mm. is collected and identified as $\alpha$-methylstyrene.

*Analysis.*—Calcd. for $C_{23}H_{23}N_7$: C, 69.50; H, 5.83; N, 24.67. Found: C, 69.68; H, 5.85; N, 24.44.

EXAMPLE VI

*Part A.—1,1,6,6-tetraphenyl-3-hexene-2,2,3,4,5,5-hexacarbonitrile*

A solution of sodium $\alpha$-phenylbenzylmalononitrile is prepared in the manner of Part A of Example IV using 24 parts of sodium hydride, 232 parts of $\alpha$-phenylbenzylmalononitrile, and 1776 parts of tetrahydrofuran. This solution is added slowly to a solution of 75 parts of dichlorofumaronitrile in 444 parts of tetrahydrofuran at $-70°$ C. to obtain a solution of 1,1,6,6-tetraphenyl-3-hexene-2,2,3,4,5,5-hexacarbonitrile.

*Part B.—Tetramethylammonium 1,1,2,3,4,4-hexacyano-5,5-diphenyl-2-pentenide*

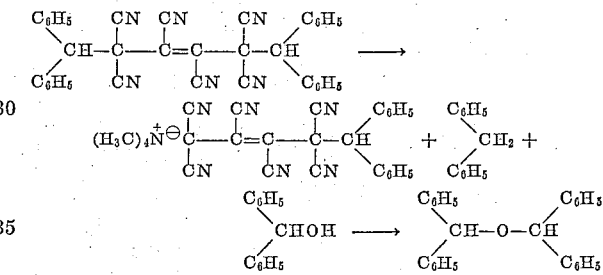

The solution of 1,1,6,6-tetraphenyl-3-hexene-2,2,3,4,5,5-hexacarbonitrile obtained in Part A is allowed to warm to room temperature. The reaction mixture which contains 1,1,2,3,4,4-hexacyano-5,5-diphenyl-2-pentene is diluted with water, the solid material is removed by filtration and to the deep yellow filtrate is added tetramethylammonium chloride. A solid soon separates that is collected and crystallized from methanol to give 86 parts of yellow crystals, M.P. 163–165° C. Four crystallizations from methanol give tetramethylammonium 1,1,2,3,4,4-hexacyano-5,5-diphenyl-2-pentenide in the form of bright yellow crystals, M.P. 168–170° C. The molecular extinction coefficients at 420, 402, and 250 m$\mu$ are 15,600, 16,400, and 4,900, respectively.

*Analysis.*—Calcd. for $C_{27}H_{23}N_7$: C, 72.79; H, 5.20; N, 22.01. Found: C, 72.89; H, 5.44; N, 21.99.

The several filtrates are combined, diluted with water, and extracted with ether. The ether solution is concentrated and a solid separates. This solid is collected and crystallized twice from ether to give colorless crystals of bis-benzhydryl ether, M.P. 107–108° C.

*Analysis.*—Calcd. for $C_{26}H_{22}O$: C, 89.11; H, 6.33. Found: C, 89.14; H, 6.53.

The liquid portion is distilled under reduced pressure and the fraction boiling at 118° C./8 mm. is collected. This fraction, identified as diphenylmethane, solidifies on cooling in ice; $n_D^{25} = 1.5622$.

EXAMPLE VII

*Part A.—1,2,7,8-tetraphenyl-4-octene-3,3,4,5,6,6-hexacarbonitrile*

A solution of sodium $\alpha,\beta$-diphenylethylmalononitrile is prepared in the manner of Part A of Example IV using 24 parts of sodium hydride, 250 parts of $\alpha,\beta$-diphenylethylmalononitrile, and 1332 parts of tetrahydrofuran. This solution is added slowly to a solution of 75 parts of dichlorofumaronitrile in 666 parts of tetrahydrofuran at −70° C. The thick reaction mixture is allowed to warm to room temperature and is diluted with ice water. The precipitate which forms is collected by filtration and washed in turn with water, methanol at −60° C., ether, and petroleum ether. The faintly yellow crystalline product weighs 180 parts. Four recrystallizations from aqueous acetone give 1,2,7,8-tetraphenyl-4-octene-3,3,4,5,6,6-hexacarbonitrile in the form of colorless crystals melting at 130–131° C.

*Part B.—Tetramethylammonium 1,1,2,3,4,4-hexacyano-5,6-diphenyl-2-hexenide*

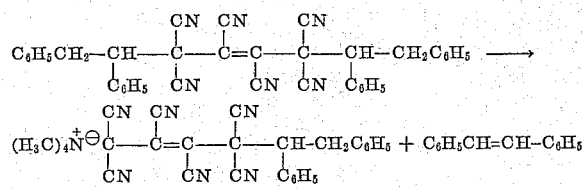

A suspension of 56.6 parts of 1,2,7,8-tetraphenyl-4-octene - 3,3,4,5,6,6 - hexacarbonitrile in 189 parts of dimethylformamide is stirred at 80–100° C. for two minutes. The resulting bright yellow solution of 1,1,2,3,4,4-hexacyano-5,6-diphenyl-2-hexene is diluted with water. The solution is neutralized with sodium bicarbonate and excess solid tetramethylammonium chloride is added. The aqueous solution is decanted from the gummy precipitate and a small amount of methanol is added. The gum changes into a solid on stirring. The yield is 14 parts of tetramethylammonium 1,1,2,3,4,4-hexacyano-5,6-diphenyl - 2- hexenide (31% yield), M.P. 185–186° C. Three crystallizations from ethanol do not change the melting point. The molecular extinction coefficients at 398 mμ and 425 mμ methanol are 16,800 and 14,200 respectively.

*Analysis.*—Calcd. for $C_{28}H_{25}N_7$: C, 73.18; H, 5.48; N, 21.34. Found: C, 72.81; H, 5.50; N, 21.11.

EXAMPLE VIII

*Part A.—2,7-bis(p-dimethylaminophenyl)-4-octene-3,3,4,5,6,6-hexacarbonitrile*

A solution of sodium α-methyl-p-dimethylaminobenzylmalononitrile is prepared in the manner of Part A of Example IV using 24 parts of sodium hydride, 213 parts of α-methyl-p-dimethylaminobenzylmalononitrile, and 1776 parts of tetrahydrofuran. This solution is added slowly to a solution of 75 parts of dichlorofumaronitrile in 444 parts of tetrahydrofuran at −70° C. to obtain a solution of 2,7-bis(p-dimethylaminophenyl)-4-octene-3,3,4,5,6,6-hexacarbonitrile.

*Part B.—Tetramethylammonium 1,1,2,3,4-4-hexacyano-5-(p-dimethylaminophenyl)-2-hexenide*

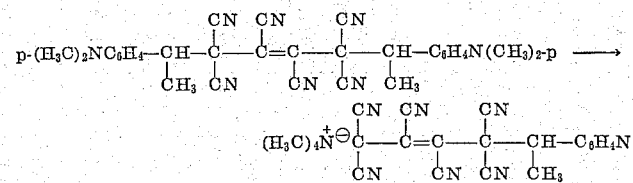

The cold reaction mixture prepared as described in Part A above is allowed to warm to room temperature to obtain a solution containing 1,1,2,3,4,4-hexacyano-5-(p-dimethylaminophenyl)-2-hexene. This is neutralized with sodium bicarbonate. Solid tetramethylammonium chloride is added, whereupon an oil separates. The tetrahydrofuran is distilled off under reduced pressure at 25–30° C. whereupon the oil solidifies. The solid is dissolved in acetonitrile and precipitated by adding ether to obtain tetramethylammonium 1,1,2,3,4,4-hexacyano - 5 - (p - dimethylaminophenyl)-2-hexenide in the form of deep yellow crystals, M.P. 148–149° C.

*Analysis.*—Calcd. for $C_{24}H_{26}N_8$: C, 67.58; H, 6.15; N, 26.27. Found: C, 67.57; H, 5.63; N, 26.76.

EXAMPLE IX

*Part A.—2,7-bis(p-chlorophenyl)-4-octene,3,3,4,5,6,6-hexacarbonitrile*

A solution of sodium α-methyl-p-chlorobenzyl-malononitrile is prepared in the manner of Part A of Example IV using 24 parts of sodium hydride, 210 parts of α-methyl-p-chlorobenzylmalononitrile, and 1776 parts of tetrahydrofuran. The resulting solution is added slowly to a solution of 75 parts of dichlorofumaronitrile in 444 parts of tetrahydrofuran at −70° C. The thick reaction mixture is allowed to warm to 0° C., and part of the tetrahydrofuran is removed by distillation under vacuum at that temperature. The residue is diluted with about 10,000 parts if ice water, and the resulting solid is collected by filtration and washed with ice water and petroleum ether. The filter cake is dissolved in 11,880 parts of acetone, and the resulting solution is treated with activated carbon and filtered. About 60,000 parts of water is added slowly to the filtrate. The precipitate which forms is collected by filtration, washed in turn with water, methanol, and petroleum ether, and dried to yield 170 parts of nearly colorless 2,7-bis(p-chlorophenyl)-4-octene-3,3,4,5,6,6-hexacarbonitrile.

*Part B.—Tetramethylammonium 1,1,2,3,4,4-hexacyano-5-(p-chlorophenyl)-2-hexenide*

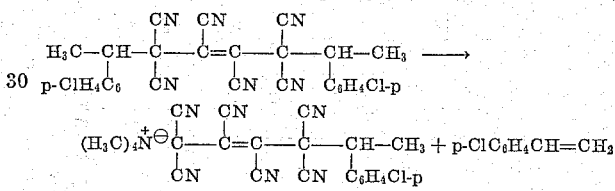

A suspension of 24 parts of 2,7-bis(p-chlorophenyl)-4-octene-3,3,4,5,6,6-hexacarbonitrile in 142 parts of dimethylformamide is stirred at 75° C. for 5 minutes. The resulting deep yellow solution of 1,1,2,3,4,4-hexacyano-5-(p-chlorophenyl)-2-hexene is diluted with 500 parts of water and the resulting solution is neutralized with sodium bicarbonate. A small amount of insoluble material is removed by filtration and solid tetramethylammonium chloride is added to the filtrate. An oil separates that solidifies on stirring at 0° C. Crystallization from acetone-methanol gives 7 parts (33% yield) of tetramethylammonium 1,1,2,3,4,4-hexacyano-5 - (p - chlorophenyl)-2-hexenide in the form of yellow crystals, M.P. 175–176° C. The molecular extinction coefficients in methanol at 420 and 398 mμ are 16,500 and 18,300 respectively.

*Analysis.*—Calcd. for $C_{22}H_{20}N_7Cl$: C, 63.23; H, 4.82; N, 23.47. Found: C, 63.53; H, 4.78; N, 23.65.

EXAMPLE X

*Part A.—2,7-bis(p-methoxyphenyl)-4-octene-3,3,4,5,6,6-hexacarbonitrile*

A solution of sodium α-methyl-p-methoxybenzylmalononitrile is prepared in the manner of Part A of Example IV using 200 parts of α-methyl-p-methoxyphenylmalononitrile. This solution is added slowly to a solution of 75 parts of dichlorofumaronitrile in 444 parts of tetrahydrofuran at −70° C. to yield a solution of 2,7-bis(p-methoxyphenyl)-4-octene-3,3,4,5,6,6-hexacarbonitrile.

*Part B.—Tetramethylammonium 1,1,2,3,4,4-hexa-cyano-5-(p-methoxyphenyl)-2-hexenide*

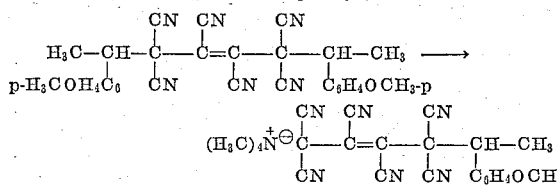

The solution of 2,7-bis(p-methoxyphenyl)-4-octene-3,3,4,5,6,6-hexacarbonitrile obtained in Part A above is allowed to warm to room temperature to obtain a solution containing 1,1,2,3,4,4-hexacyano-5-(p-methoxyphenyl)-2-hexene. The reaction mixture is poured into 5000 parts of water, the mixture is neutralized with sodium bicarbonate, and solid tetramethylammonium chloride is added. The tetrahydrofuran is distilled off under reduced pressure, whereupon a solid is obtained. The solid is collected, washed with water and −40° C. methanol. The yield of yellow crystalline material melting at 203–204° C. is 180 parts (78%). Three crystallizations from acetone-methanol give tetramethylammonium 1,1,2,3,4,4-hexacyano-5-(p-methoxyphenyl)-2-hexenide in the form of bright yellow crystals melting at 206–207° C. The molecular extinction coefficients in methanol at 400 and 420 m$\mu$ are 18,200 and 19,900 respectively.

*Analysis.*—Calcd. for $C_{23}H_{23}ON_7$: C, 66.81; H, 5.61; N, 23.72. Found: C, 66.92; H, 5.70; N, 24.04.

EXAMPLE XI

*Part A.—1,6-bis(p-methoxyphenyl)-1,6-diphenyl-3-hexene-2,2,3,4,5,5-hexacarbonitrile*

A solution of sodium p-methoxyphenylbenzylmalononitrile is prepared in the manner of Part A of Example IV using 24 parts of sodium hydride, 262 parts of p-methoxyphenylbenzylmalononitrile, and 1332 parts of tetrahydrofuran. This solution is added slowly to a solution of 75 parts of dichlorofumaronitrile in 444 parts of tetrahydrofuran at −70° C. to obtain a solution of 1,6-bis(p-methoxyphenyl)-1,6-diphenyl-3-hexene - 2,2,3,4,5,5 - hexacarbonitrile.

*Part B.—Tetramethylammonium 1,1,2,3,4,4-hexacyano-5-(p-methoxyphenyl)-5-phenyl-2-pentenide*

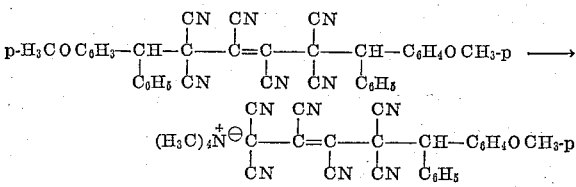

The reaction mixture obtained in Part A above is warmed rapidly to 20° C. to obtain a solution containing 1,1,2,3,4,4-hexacyano-5 - (p-methoxyphenyl) - 5-phenyl-2-pentene. This is poured into a solution of 140 parts of sodium acetate trihydrate in 5000 parts of water. Solid tetramethylammonium chloride (250 parts) is added and the tetrahydrofuran is distilled off under reduced pressure. The aqueous layer is decanted from the gum that separates and the gum is dissolved in methylene chloride. The methylene chloride solution is washed with two portions of 10% aqueous tetramethylammonium chloride, dried with anhydrous magnesium sulfate and concentrated by evaporation under reduced pressure. Methanol (793 parts) is added and the concentration continued under reduced pressure until a thick paste of the tetramethylammonium 1,1,2,3,4,4-hexacyano - 5-(p-methoxyphenyl)-5-phenyl-2-pentenide is obtained. After cooling at 0° C. for one hour, the precipitate is collected and washed with −40° C. methanol until the washings are free of a red impurity. After washing with ether, the filter cake is dried under reduced pressure. The yield of pentenide melting at 150–151° C. is 400 parts. Three crystallizations from methylene chloride-methanol give bright yellow crystals, M.P. 151–152° C.

*Analysis.*—Calcd. for $C_{28}H_{25}ON_7$: C, 70.72; H, 5.30; N, 20.62. Found: C, 71.04; H, 5.30; N, 20.28.

EXAMPLE XII

*Part A.—2,7-dimethyl-4-octene-3,3,4,5,6,6-hexacarbonitrile*

A solution of sodium isopropylmalononitrile is prepared in the manner of Part A of Example IV using 72 parts of sodium hydride, 324 parts of isopropylmalononitrile, and 1776 parts of tetrahydrofuran. This solution is added slowly to a solution of 233 parts of dichlorofumaronitrile in 1776 parts of tetrahydrofuran at −70° C. The resulting thick mixture is allowed to warm to 20° C., and most of the tetrahydrofuran is removed by distillation under vacuum at that temperature. The residue is washed in turn with water, methanol, and ether. The colorless filter cake is dissolved in about 31,680 parts of acetone, treated with activated carbon, and filtered. To the filtrate is added slowly about 80,000 parts of warm water. The colorless precipitate which forms is collected by filtration, washed in turn with water, methanol, and ether and dried to yield 381 parts of 2,7-dimethyl - 4 - octene-3,3,4,5,6,6-hexacarbonitrile in the form of a colorless, crystalline powder melting at 264–265° C.

*Part B.—Tetramethylammonium 1,1,2,3,4,4-hexacyano-5-methyl-2-hexenide*

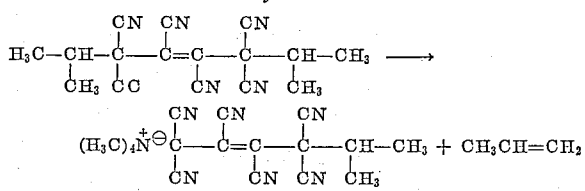

A solution of 29 parts of 2,7-dimethyl-4-octene-3,3,4,5,6,6-hexacarbonitrile in 95 parts of dimethylformamide is refluxed under nitrogen for one hour. The solution of 1,1,2,3,4,4-hexacyano-5-methyl-2-hexene which results is diluted with water, the precipitate is filtered off and solid tetramethylammonium chloride is added to the bright yellow filtrate. The precipitate of tetramethylammonium 1,1,2,3,4,4-hexacyano-5-methyl - 2 - hexenide which separates is collected by filtration and dried.

EXAMPLE XIII

*Part A.—1,8-diphenyl-4-octene-3,3,4,5,6,6-hexacarbonitrile*

A solution of sodium β-phenylethylmalononitrile is prepared essentially as described in Part A of Example IV using 170 parts of β-phenylethylmalononitrile and 24 parts of sodium hydride in 888 parts of tetrahydrofuran at 0–5° C. The resulting solution is added slowly to a solution of 75 parts of dichlorofumaronitrile in 666 parts of tetrahydrofuran at −70° C. During warming to 0° C., the original solid dissolves and a solid precipitates. After diluting with about 800 parts of water, the solid is collected, washed with water, then with methanol until the washings are colorless and finally with ether to yield 200 parts of 1,8-diphenyl - 4 - octene - 3,3,4,5,6,6-hexacarbonitrile, M.P. 270–271° C. Two recrystallizations from acetone/water give colorless crystals, M.P. 271–272° C.

*Part B.—1,1,2,3,4,4-hexacyano-6-phenyl-2-hexene*

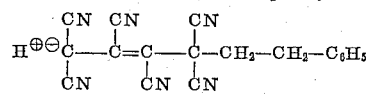

A mixture of approximately equal parts of 1,8-diphenyl-4-octene - 3,3,4,5,6,6 - hexacarbonitrile and the lactone of crystal violet is dissolved in acetone, and the resulting colorless solution is used to impregnate paper. The solvent is removed by evaporation, and the paper containing the mixed crystal deposit is heated at 125–175° C. Under these conditions 1,1,2,3,4,4-hexacyano-6-phenyl-2-hexene is formed. Its presence is confirmed by its acidic action on the lactone of crystal violet causing the treated paper to turn dark green in color. The dark green is a composite of the blue color of the crystal violet after ring opening of the lactone plus the yellow of the hexene.

EXAMPLE XIV

*Part A.—2,9-dimethyl-5-decene-4,4,5,6,7,7-hexacarbonitrile*

To a mechanically stirred suspension of 45 parts of 52.3% sodium hydride in 444 parts of tetrahydrofuran is added slowly a solution of 125 parts of isobutylmalononitrile in 444 parts of tetrahydrofuran at 0–5° C. under an atmosphere of nitrogen. A completely homogeneous solution of sodium isobutylmalononitrile is obtained shortly after the addition is completed. This solution is added slowly to a mechanically stirred solution of 75 parts of dichlorofumaronitrile in 888 parts of tetrahydrofuran cooled to −60° C. The thick reaction mixture is allowed to warm to room temperature and diluted with about 8000 parts of ice water. The solid material which separates is collected by filtration and washed in turn with water, methanol, and ether to yield 120 parts of nearly colorless, crystalline 2,9-dimethyl-5-decene-4,4,5,6,7,7-hexacarbonitrile. Recrystallization from acetone/water gives colorless crystals, M.P. 222–223° C.

*Part B.—1,1,2,3,4,4-hexacyano-6-methyl-2-heptene*

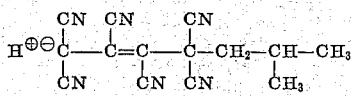

A mixture of approximately equal parts of 2,9-dimethyl-5-decene-4,4,5,6,7,7-hexacarbonitrile and the lactone of crystal violet is dissolved in acetone, and the resulting colorless solution is used to impregnate paper. The solvent is removed by evaporation, and the paper containing the mixed crystal deposit is heated at 125–175° C. Under these conditions 1,1,2,3,4,4-hexacyano-6-methyl-2-heptene is formed. Its presence is confirmed by its acidic action on the lactone of crystal violet causing the treated paper to turn dark green in color. The dark green is a composite of the blue color of the crystal violet after ring opening of the lactone plus the yellow color of the heptene.

EXAMPLE XV

*Part A.—1,4-bis(1-methylcyclohexyl)-2-butene-1,1,2,3,4,4-hexacarbonitrile*

A solution of sodium 1-methylcyclohexylmalononitrile is prepared essentially as described in Part A of Example XIV using 330 parts of 1-methylcyclohexylmalononitrile and 48 parts of sodium hydride in 1332 parts of tetrahydrofuran at 0–5° C. This solution is added slowly to a solution of 150 parts of dichlorofumaronitrile in 888 parts of tetrahydrofuran at −60° C. The resulting thick, deep purple reaction mixture is diluted with about 17,000 parts of water after warming to 20° C. The solid which separates is collected, washed with water, then with methanol until the washings are colorless and finally with ether. Recrystallization of the crude material (320 parts) from aqueous acetone gives 260 parts of colorless 1,4-bis(1-methylcyclohexyl)-2-butene-1,1,2,3,4,4-hexacarbonitrile.

*Part B.—Tetramethylammonium 1,1,2,3,4,4-hexacyano-4-(1-methylcyclohexyl)-2-butenide*

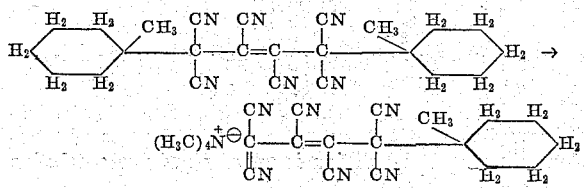

A suspension of 30 parts of 1,4-bis(1-methylcyclohexyl)-2-butene-1,1,2,3,4,4-hexacarbonitrile in 142 parts of dimethylformamide is heated at 75–95° C. until a homogeneous solution is obtained. The resulting deep yellow solution is concentrated under reduced pressure at 60° C. The residue is dissolved in about 200 parts of water and treated with activated carbon. The strongly acidic filtrate containing 1,1,2,3,4,4-hexacyano-4-(1-methylcyclohexyl)-2-butene is neutralized with 10% tetramethylammonium hydroxide. Crystals of the salt separate during this process. After adding 100 parts of 20% aqueous tetramethylammonium chloride and cooling at 0° C., the crystals are collected and washed with a small volume of ice water. The yield of deep yellow crystals melting at 215–216° C. is 26 parts (87% yield). After two crystallizations from methanol by cooling to −40° C., yellow crystals of tetramethylammonium 1,1,2,3,4,4-hexacyano-4-(1-methylcyclohexyl)-2-butenide are obtained which melt at 215–216° C., $$\lambda_{max.}^{CH_3OH} = 415 \ m\mu (\epsilon = 17,500)$$

*Analysis.*—Calcd. for $C_{21}H_{25}N_7$: C, 67.17; H, 6.71; N, 26.12. Found: C, 67.33; H, 6.65; N, 25.98.

EXAMPLE XVI

*Part A.—1,4-bis(1-methylcyclopentyl)-2-butene-1,1,2,3,4,4-hexacarbonitrile*

A solution of sodium 1-methylcyclopentylmalononitrile is prepared essentially as described in Part A of Example XIV using 300 parts of 1-methylcyclopentylmalononitrile and 48 parts of sodium hydride in 1332 parts of tetrahydrofuran at 0–5° C. This solution is added slowly to a solution of 150 parts of dichlorofumaronitrile in 888 parts of tetrahydrofuran at −60° C. The resulting thick, deep violet reaction mixture is allowed to warm to 20° C. and diluted with about 17,000 parts of ice water. The solid which separates is collected and washed in turn with water, methanol, and ether to yield 220 parts of colorless crystals of 1,4-bis(1-methylcyclopentyl)-2-butene-1,1,2,3,4,4-hexacarbonitrile melting at 137–139° C.

*Part B.—Tetramethylammonium 1,1,2,3,4,4-hexacyano-4-(1-methylcyclopentyl)-2-butenide*

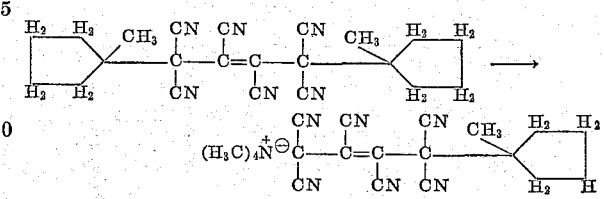

A suspension of 37 parts of 1,4-bis(1-methylcyclopentyl)-2-butene-1,1,2,3,4,4-hexacarbonitrile in 142 parts of dimethylformamide is heated at 75–95° C. for two minutes, whereupon a bright yellow solution of 1,1,2,3,4,4-hexacyano-4-(1-methylcyclopentyl)-2-butene is obtained. The resulting solution is concentrated under reduced pressure at 50–60° C. The residue is dissolved in about 200 parts of water. The solution is treated with activated carbon, filtered, and to the filtrate is added 10% tetramethylammonium hydroxide until the solution is neutral. Crystals of the tetramethylammonium salt separate during this process. After adding 100 parts of 20% aqueous tetramethylammonium chloride solution and cooling at 0° C., the yellow crystals are collected and washed with a small volume of ice water. Crystallization from methanol by cooling to −40° C. gives 29 parts (81% yield) of deep yellow crystals of tetramethylammonium 1,1,2,3,4,4-hexacyano-4-(1-methylcyclopentyl)-2-butenide, M.P. 199–200° C. A sample is crystallized from methanol, M.P. 199–200° C., $$\lambda_{max.}^{CH_3OH} = 400 \ m\mu (\epsilon = 16,900)$$

Analysis.—Calcd. for C₂₀H₂₃N₇: C, 66.46; H, 6.41; N, 27.13. Found: C, 66.53; H, 6.47; N, 27.10.

EXAMPLE XVII

*Part A.—1,4-bis(cyclopentyl)-2-butene-1,1,2,3,4,4-hexacarbonitrile*

A solution of sodium cyclopentylmalononitrile is prepared as described in Part A of Example XIV using 270 parts of cyclopentylmalononitrile and 48 parts of sodium hydride in 888 parts of tetrahydrofuran at 0–5° C. This solution is added slowly to a solution of 150 parts of dichlorofumaronitrile in 1332 parts of tetrahydrofuran at −60° C. The resulting deep purple, thick reaction mixture is allowed to warm to 20° C. and diluted with about 7500 parts of ice water. The purple solid which forms is collected by filtration and washed with cold water. The filter cake is washed with methanol until the washings are essentially colorless. After washing with ether, the material is dried under reduced pressure. The material is dissolved in acetone (3 parts per 950 parts), the solution is filtered and concentrated to a small volume during which process colorless crystals separate. The crystalline material is collected, washed with acetone until colorless, then washed with ether to yield 173 parts of 1,4-bis(cyclopentyl) - 2 - butene - 1,1,2,3,4,4 - hexacarbonitrile, M.P. >275° C.

*Part B.—1,1,2,3,4,4-hexacyano-4-cyclopentyl-2-butene*

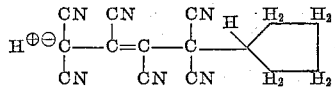

A mixture of approximately equal parts of 1,4-bis(cyclopentyl)-2-butene-1,1,2,3,4,4-hexacarbonitrile and the lactone of crystal violet is dissolved in acetone. The resulting colorless solution is used to impregnate paper. The solvent is removed by evaporation, and the paper containing the mixed crystal deposit is heated at 125–175° C. Under these conditions 1,1,2,3,4,4-hexacyano-4-cyclopentyl-2-butene is formed. Its presence is confirmed by its acidic action on the lactone of crystal violet causing the treated paper to turn dark green in color. The dark green is a composite of the blue color of the crystal violet after ring opening of the lactone plus the yellow color of the butene.

EXAMPLE XVIII

*Part A.—2,3,8,9-tetramethyl-5-decene-4,4,5,6,7,7-hexacarbonitrile*

A solution of sodium 1,2-dimethylpropylmalononitrile is prepared essentially as described in Part A of Example XIV using 370 parts of 1,2-dimethylpropylmalononitrile and 48 parts of sodium hydride in tetrahydrofuran at 0–5° C. This solution is added slowly to a solution of 150 parts of dichlorofumaronitrile in 1332 parts of tetrahydrofuran at −60° C. This thick reaction mixture is allowed to warm to room temperature and diluted with about 7500 parts of ice water. The solid which separates is collected by filtration and washed in turn with water, methanol cooled to −40° C. and ether to yield 300 parts of 2,3,8,9 - tetramethyl - 5 - decene-4,4,5,6,7,7-hexacarbonitrile.

*Part B.—Tetramethylammonium 1,1,2,3,4,4-hexacyano-5,6-dimethyl-2-heptenide*

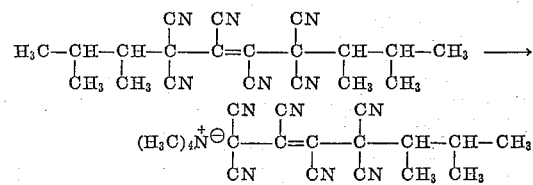

A solution of 50 parts of 2,3,8,9-tetramethyl-5-decene-4,4,5,6,7,7-hexacarbonitrile in 472 parts of dimethylformamide is heated at 145–150° C. for 40 minutes. The resulting deep brown solution of 5,6-dimethyl-1,1,2,3,4,4-hexacyano-2-heptene is concentrated under reduced pressure, and the residue is dissolved in about 250 parts of water, treated with activated carbon and filtered. Solid tetramethylammonium chloride (ca. 150 parts) is added to the filtrate, whereupon a dark oil separates that solidifies on stirring and cooling at 0° C. The salt is collected and washed with a small volume of ice water. The crude dark colored salt is dissolved in methanol and reprecipitated by the addition of 20% aqueous tetramethylammonium chloride. Five crystallizations from methanol-water give 18 parts of tetramethylammonium 1,1,2,3,4,4-hexacyano-5,6-dimethyl-2-heptenide in the form of deep yellow crystals, M.P. 133–134° C.;

$$\lambda_{max.}^{CH_3OH} = 396 \ m\mu \ (\epsilon = 18,000)$$

Analysis.—Calcd. for C₁₉H₂₃N₇: C, 65.30; H, 6.63; N, 28.06. Found: C, 65.37; H, 6.94; N, 27.90.

EXAMPLE XIX

*Part A.—3,3,8,8-tetramethyl-5-decene-4,4,5,6,7,7-hexacarbonitrile*

A solution of sodium 1,1-dimethyl-n-propylmalononitrile is prepared in the manner of Part A of Example XIV using 72 parts of sodium hydride, 410 parts of 1,1-dimethyl-n-propylmalononitrile, and 3000 parts of tetrahydrofuran. This solution is added slowly to a solution of 225 parts of dichlorofumaronitrile in 2000 parts of tetrahydrofuran at −70° C. The reaction mixture is allowed to warm to room temperature and is diluted with ice water. The precipitate which forms is separated by filtration and washed in turn with water, methanol at −10° C., ether, and petroleum ether. The nearly colorless product weighs 450 parts. Two crystallizations from aqueous acetone give 3,3,8,8-tetramethyl-5-decene-4,4,5,6,7,7-hexacarbonitrile in the form of colorless crystals melting at 186–187° C.

*Part B.—Tetramethylammonium 1,1,2,3,4,4-hexacyano-5,5-dimethyl-2-heptenide*

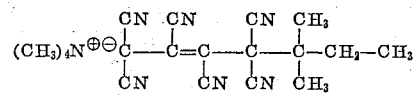

A suspension of 20 parts of 3,3,8,8-tetramethyl-5-decene-4,4,5,6,7,7-hexacarbonitrile in 144 parts of dimethylformamide is heated at 75–95° C. until a homogeneous solution is obtained. The resulting deep yellow solution is concentrated by evaporation under reduced pressure at 60° C., leaving a yellow residue of 1,1,2,3,4,4-hexacyano-5,5-dimethyl-2-heptene. The residue is dissolved in 200 parts of water, and the resulting strongly acidic solution is neutralized with 10% aqueous tetramethylammonium hydroxide, followed by the addition of 100 parts of 20% aqueous tetramethylammonium chloride. The yellow solid which separates is collected by filtration and recrystallized from methanol to obtain 20 parts of tetramethylammonium 1,1,2,3,4,4 - hexacyano - 5,5 - dimethyl-2-heptenide in the form of bright yellow crystals melting at 205–206° C. A methanol solution of this solid shows an absorption maximum at 413 millimicrons with a molecular extinction coefficient of 17,400.

Analysis.—Calcd. for C₁₉H₂₃N₇: C, 65.30; H, 6.63; N, 28.06. Found: C, 65.03; H, 6.52; N, 28.42.

EXAMPLE XX

*Part A.—2,3,3,8,8,9-hexamethyl-5-decene-4,4,5,6,7,7-hexacarbonitrile*

A solution of sodium 1,1,2-trimethyl-n-propyl-malononitrile is prepared in the manner of Part A of Example XIV using 24 parts of sodium hydride, 150 parts of 1,1,2-trimethyl-n-propylmalononitrile, and 1332 parts of tetrahydrofuran. The solution is added slowly to a solution of 71 parts of dichlorofumaronitrile in 666 parts of tetrahydrofuran at −70° C. The reaction mixture is allowed to warm to −20° C. and is diluted with ice water. The precipitate which forms is collected by filtration and washed in turn with water, methanol at −40° C., ether, and petroleum ether. The resulting 2,3,3,8,8,9-hexamethyl - 5 - decene - 4,4,5,6,7,7 - hexacarbonitrile is a colorless compound melting at 97–98° C.

*Part B.—Tetramethylammonium 1,1,2,3,4,4-hexacyano-5,5,6-trimethyl-2-heptenide*

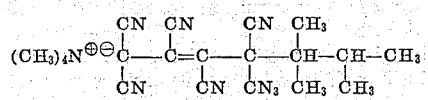

A solution of 19 parts of 2,3,3,8,8,9-hexamethyl-5-decene-4,4,5,6,7,7-hexacarbonitrile in 95 parts of dimethylformamide is heated for two minutes at 75–95° C. The solution turns deep yellow with the formation of 1,1,2,3,4,4-hexacyano-5,5,6-trimethyl-2-heptene. It is diluted with 300 parts of water, and the resulting strongly acidic solution is neutralized with 10% aqueous tetramethylammonium hydroxide, followed by the addition of 300 parts of 20% aqueous tetramethylammonium chloride. The bright yellow crystals which form are separated by filtration and recrystallized two times from methanol to give 13 parts of tetramethylammonium 1,1,2,3,4,4-hexacyano-5,5,6-trimethyl-2-heptenide in the form of bright yellow crystals melting at 178–179° C. A methanol solution of this compound shows an absorption maximum at 415 millimicrons with a molecular extinction coefficient of 17,500.

*Analysis.*—Calcd. for $C_{20}H_{25}N_7$: C, 66.09; H, 6.93; N, 26.98. Found: C, 66.27; H, 6.92; N, 27.14.

EXAMPLE XXI

*Part A.—2,7-bis(2-furyl)-4-octene-3,3,4,5,6,6-hexacarbonitrile*

A solution of sodium α-methyl-2-furfurylmalononitrile is prepared in the manner of Part A of Example XIV using 48 parts of sodium hydride, 320 parts of α-methyl-2-furfurylmalononitrile, and 2664 parts of tetrahydrofuran. This solution is added slowly to a solution of 150 parts of dichlorofumaronitrile in 888 parts of tetrahydrofuran at −70° C. to obtain a solution of 2,7-bis(2-furyl)-4-octene-3,3,4,5,6,6-hexacarbonitrile.

*Part B.—Tetramethylammonium 1,1,2,3,4,4-hexacyano-5-(2-furyl)-2-hexenide*

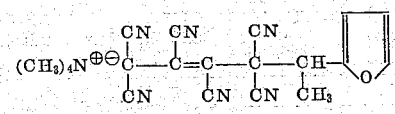

The solution of 2,7-bis(2-furyl)-4-octene-3,3,4,5,6,6-hexacarbonitrile obtained in Part A above is allowed to warm to room temperature. It turns bright yellow with the formation of 1,1,2,3,4,4-hexacyano-5-(2-furyl)-2-hexene. The solution is diluted with water. The upper aqueous layer which forms is separated by decantation, neutralized with 10% aqueous tetramethylammonium hydroxide and the tetrahydrofuran is removed by distillation under reduced pressure. The brown solid residue is separated by filtration and recrystallized from methanol to obtain 182 parts of bright yellow crystals melting at 138–139° C. The lower layer remaining from the above decantation is dissolved in water, neutralized with 10% aqueous tetramethylammonium hydroxide, and the solid which separates is recrystallized from methanol to give 64 parts of bright yellow crystals melting at 138–139° C. alone or in admixture with the above crystals. An additional 33 parts of yellow crystals melting at 138–139° C. is obtained by further concentration of the mother liquors. The total yield is 279 parts of tetramethylammonium 1,1,2,3,4,4-hexacyano-5-(2-furyl)-2-hexenide melting at 138–139° C. A methanol solution of this compound shows an absorption maximum at 398 millimicrons with a molecular extinction coefficient of 16,800.

*Analysis.*—Calcd. for $C_{20}H_{19}ON_7$: C, 64.33; H, 5.13; N, 26.26. Found: C, 64.44; H, 5.33; N, 26.62.

EXAMPLE XXII

*Part A.—2,7-bis(p-isopropylphenyl)-4-octene-3,3,4,5,6,6-hexacarbonitrile*

A solution of sodium α-methyl-p-isopropylbenzylmalononitrile is prepared in the manner of Part A of Example XIV using 48 parts of sodium hydride, 420 parts of α-methyl-p-isopropylbenzylmalononitrile, and 2664 parts of tetrahydrofuran. This solution is addd slowly to a solution of 150 parts of dichlorofumaronitrile in 1332 parts of tetrahydrofuran at −70° C. The reaction mixture is allowed to warm to −20° C. and is diluted with ice water. The gummy prceipitate which forms is collected by filtration and washed with water. The gummy precipitate is stirred with methanol at −10° C., whereupon a light yellow solid is obtained. The solid is collected by filtration, is washed in turn with methanol at −10° C., ether and petroleum ether. The mother liquor from this filtration and washing contains dissolved product and is held at −10° C. for Part B. Three crystallizations of the solid from aqueous acetone give 2,7-bis(p-isopropylphenyl) - 4 - octene - 3,3,4,5,6,6-hexacarbonitrile in the form of colorless crystals melting at 141–142° C. with decomposition.

*Part B.—Tetramethylammonium 1,1,2,3,4,4-hexacyano-5-(p-isopropylphenyl)-2-hexenide*

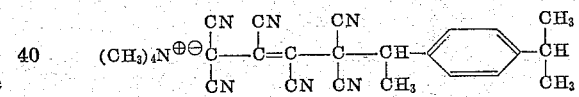

The mother liquor noted in Part A above contains dissolved 2,7-bis(p-isopropylphenyl) - 4 - octene-3,3,4,5,6,6-hexacarbonitrile. It is allowed to warm to about 25° C., during which process it turns yellow and becomes strongly acidic with the formation of 1,1,2,3,4,4-hexacyano-5-(p-isopropylphenyl)-2-hexene. This solution is neutralized with 10% aqueous tetramehylammonium hydroxide and 100 parts of solid tetramethylammonium chloride is added. The organic solvents are removed by distillation under reduced pressure leaving tetramethylammonium 1,1,2,3,4,4-hexacyano-5-(p-isopropylphenyl) - 2-hexenide as a solid yellow residue. This is recrystallized three times from methanol to give 50 parts of bright yellow crystals melting at 156–157° C. A methanol solution of this compound shows an absorption maximum at 398 millimicrons with a molecular extinction coefficient of 16,600.

*Analysis.*—Calcd. for $C_{25}H_{27}N_7$: C, 70.56; H, 6.40; N, 23.04. Found: C, 70.84; H, 6.25; N, 22.93.

EXAMPLE XXIII

*Part A.—2,7-bis(p-methoxycarbonylphenyl)-4-octene-3,3,4,5,6,6-hexacarbonitrile*

A solution of sodium α-methyl-p-carbomethyloxybenzylmalononitrile is prepared in the manner of Part A of Example XIV using 16 parts of sodium hydride, 150 parts of α-methyl-p-carbomethoxybenzylmalononitrile, and 750 parts of tetrahydrofuran. This solution is added slowly to 49 parts of dichlorofumaronitrile in 500 parts to tetrahydrofuran at −70° C. The reaction mixture is allowed to warm to 0° C. and is diluted with ice water.

The gummy precipitate which forms is collected and stirred with cold methanol whereupon a crystalline solid is obtained. The crystalline material is collected by filtration and washed in turn with methanol at −20° C. and ether at −40° C. The nearly colorless product weighs 35 parts and melts at 180–182° C. with decomposition. Two crystallizations from acetone give 2,7-bis(p-methoxycarbonylphenyl) - 4 - octene - 3,3,4,5,6,6-hexacarbonitrile in the form of colorless crystals melting at 182–183° C. with decomposition.

*Part B.—Tetramethylammonium 1,1,2,3,4,4-hexacyano-5-(p-methoxycarbonylphenyl)-2-hexenide*

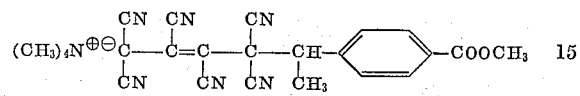

A suspension of 10 parts of 2,7-bis(p-methoxycarbonylphenyl)-4-octene-3,3,4,5,6,6-hexacarbonitrile in 95 parts of dimethylformamide is heated at 75–95° C. for 30 minutes. The dimethylformamide is removed from the resulting bright yellow solution by distillation under reduced pressure yielding 1,1,2,3,4,4-hexacyano-5-(p-methoxycarbonylphenyl)-2-hexene in the form of a deep yellow syrup. This is suspended in 200 parts of water and neutralized with 10% aqueous tetramethylammonium hydroxide. The yellow crystals which form are separated by filtration and recrystallized two times from methanol to yield 2.5 parts of tetramethylammonium, 1,1,2,3,4,4-hexacyano-5-(p-methoxycarbonylphenyl)-2-hexenide in the form of yellow crystals melting with decomposition at 223–225° C.

*Analysis.*—Calcd. for $C_{24}H_{23}O_4N_6$: C, 65.29; H, 5.25; N, 22.21. Found: C, 65.00; H, 5.13; N, 22.12.

EXAMPLE XXIV

*Part A.—2,7-bis(p-cyanophenyl)-4-octene-3,3,4,5,6,6-hexacarbonitrile*

A solution of sodium α-methyl-p-cyanobenzylmalononitrile is prepared in the manner of Part A of Example XIV using 24 parts of sodium hydride, 195 parts of α-methyl-p-cyanobenzylmalononitrile, and 1000 parts of tetrahydrofuran. This solution is added slowly to a solution of 75 parts of dichlorofumaronitrile in 700 parts of tetrahydrofuran at −70° C. The reaction mixture is warmed to 10° C. and diluted with ice water. The precipitate which forms is collected by filtration and washed in turn with water, methanol at −10° C., and ether at −20° C. The nearly colorless product weighs 180 parts and melts at 198–200° C. with decomposition.

*Part B.—1,1,2,3,4,4-hexacyano-5-(p-cyanophenyl)-2-hexene*

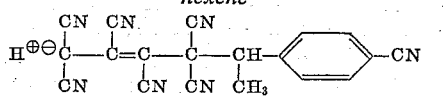

A mixture of approximately equal parts of 2,7-bis(p-cyanophenyl)-4-octene-3,3,4,5,6,6 - hexacarbonitrile and the lactone of crystal violet is dissolved in acetone, and the resulting colorless solution is used to impregnate paper. The solvent is removed by evaporation, and the paper containing the mixed crystal deposit is heated at 125–175° C. Under these conditions 1,1,2,3,4,4-hexacyano-5-(p-cyanophenyl)-2-hexane is formed. Its presence is confirmed by its acidic action on the lactone of crystal violet causing the treated paper to turn dark green in color. The dark green is a composite of the blue color of the crystal violet after ring opening of the lactone plus the yellow color of the hexene.

The products of this invention, both the free acids and the salts, are all colored compounds and are generically useful as dyes. They are additionally useful as dye intermediates. This is illustrated in Examples A and B which follow.

The substituted malononitriles used for preparing the 1,4-disubstituted 2-butenehexacarbonitrile starting materials for the process of this invention are synthesized from aldehydes and ketones by methods known in the art. These may be illustrated as follows:

*Synthesis A.*—The selected aldehyde or ketone is condensed with malononitrile in the presence of β-alanine and acetic acid or in the presence of piperidine to yield the corresponding alkylidenemalononitrile. The alkylidenemalononitrile is subjected to catalytic hydrogenation, for example, using palladium-on-carbon catalyst, to yield the desired substituted malononitrile.

*Synthesis B.*—An alkylidenemalononitrile is synthesized as described in Synthesis A. This is then treated with methylmagnesium bromide to yield the corresponding α-methyl monosubstituted malononitrile.

*Synthesis C.*—Phenylmagnesium bromide is used in place of methylmagnesium bromide in Synthesis B to obtain the corresponding α-phenyl monosubstituted malononitrile.

*Synthesis D.*—Benzylmagnesium bromide is used in place of methylmagnesium bromide in Synthesis B to obtain the corresponding α-benzyl monosubstituted malononitrile.

The substituted malononitriles indicated in Table I are employed in the examples below and are synthesized from the indicated starting materials by the methods noted.

TABLE I

| Aldehyde or ketone starting material | Synthesis method | Substituted malononitrile product |
|---|---|---|
| Acetone | D | α,α-Dimethyl-β-phenylethylmalononitrile. |
| Do | B | t-Butylmalononitrile. |
| Benzaldehyde | B | α-methylbenzylmalononitrile. |
| Acetophenone | B | α,α-Dimethylbenzylmalononitrile. |
| Benzaldehyde | C | α-Phenylbenzylmalononitrile. |
| Do | D | Do. |
| p-Dimethylaminobenzaldehyde | B | α-Methyl-p-(dimethylamino)-benzylmalononitrile. |
| p-Chlorobenzaldehyde | B | α-Methyl-p-chlorobenzylmalononitrile. |
| p-Methoxybenzaldehyde | B | α-Methyl-p-methoxybenzylmalononitrile. |
| Do | C | Do. |
| Acetone | A | Isopropylmalononitrile. |
| β-Phenylacetaldehyde | A | β-Phenylethylmalononitrile. |
| Isobutyraldehyde | A | Isobutylmalononitrile. |
| Cyclohexanone | B | 1-methylcyclohexylmalononitrile. |
| Cyclopentanone | B | 1-methylcyclopentylmalononitrile. |
| Do | A | Cyclopentylmalononitrile. |
| Isobutyraldehyde | B | 1,2-dimethylpropylmalononitrile. |
| Methyl ethyl ketone | B | 1,1-dimethylpropylmalononitrile. |
| Methyl isopropyl ketone | B | 1,1,2-trimethylpropylmalononitrile. |
| Furfuraldehyde | B | α-Methylfurfurylmalononitrile. |
| Cumaldehyde | B | α-Methyl-p-isopropylbenzylmalononitrile. |
| p-(Methoxycarbonyl)-acetophenone | A | α-Methyl-p-(methoxycarbonyl)-benzylmalononitrile. |
| p-Cyanoacetophenone | A | α-Methyl-p-cyanobenzylmalononitrile. |

The use of the products of this invention as dyes is illustrated in Examples A and B which follow.

EXAMPLE A

A dye bath is prepared using 5000 parts of water and one part of a sulfonated lignin dispersant to which is added a solution of one part of tetramethylammonium 1,1,2,3,4,4-hexacyano-5-benzyl-5-methyl-2-hexenide (product of Example I) in 100 parts of methanol. The bath is agitated and 5-part swatches of cellulose acetate, nylon, silk, and wool fabrics are added. The bath is heated at 90–95° C. and after a few minutes the fabrics are all dyed yellow, the shade varying with the composition of the fabric. The dyed fabrics are rinsed in water and dried.

EXAMPLE B

A dye bath is prepared using 5000 parts of water and one part of a sulfonated lignin dispersant to which is added a solution of one part of tetraethylammonium 1,1,2,3,4,4-hexacyano-5,5-dimethyl-2-hexenide (product of Example III) in 100 parts of methanol. The bath is agitated and 5-part swatches of cellulose acetate, nylon, silk, and wool fabrics are added. The bath is heated at 90–95° C. and after a few minutes the fabrics are all dyed yellow, the shade varying with the composition of the fabric. The dyed fabrics are rinsed with water and dried.

The synthesis of hexacarbonitriles of Formulas I and IV above is possible through reaction of 1,2-dihalo-1,2-dicyanoethylenes with alkali metal derivatives of monosubstituted malononitriles as shown in Part A of many of the preceding examples. Many monosubstituted malononitriles and numerous means for their preparation are known. Substituents in monosubstituted malononitriles are derivable, among other ways, from aldehydes and ketones by known synthetic reactions as discussed above. Any known aldehyde or ketone may be employed. Since substantially all organic radicals are available as moieties of known aldehydes and ketones and since further modifications may be readily introduced in the Grignard synthesis of monosubstituted malononitriles, as illustrated in Syntheses B, C, and D discussed above, any known organic radical may be obtained as a substituent in a 1,4-disubstituted 2-butenehexacarbonitrile. The required monosubstituted malononitrile is prepared by known synthetic routes and employed in the process of this invention to yield the desired 1,4-disubstituted 2-butenehexacarbonitrile.

The process and products of this invention are further illustrated in Table II. The indicated monosubstituted malononitrile is prepared from the indicated known aldehyde or ketone by condensation with malononitrile to obtain an ylidenemalononitrile, which by reaction with hydrogen or a Grignard reagent as in Syntheses A, B, C, or D yields the indicated monosubstituted malononitrile. This in turn is substituted for α,α-dimethyl-β-phenylethylmalononitrile in the procedure of Example I to obtain the indicated 1,4-disubstituted 2-butenehexacarbonitrile, which on heating yields the indicated 4-substituted-1,1,2,3,4,4-hexacyano-2-butene.

In order to clarify the structural relationships of the products of this invention, many of them have been arbitrarily named as 2-butenes or 2-butenides. It will be understood that, as indicated in some of the examples, there may be other tenable ways of naming these compounds, some of which may even be preferable for purposes of chemical indexing.

The 1,1,2,3,4,4-hexacyano-2-butene nucleus with the remaining 4 position attached to a carbon atom is the characteristic structure of all the products of this invention and is controlling in selected properties of these compounds regardless of the size or structure of the organic radicals represented by the carbon attachment of the 4 position.

The foregoing detailed description has been given for clearness of understanding only and no unnecessary limitations are to be understood therefrom. The invention is not limited to the exact details shown and described for obvious modifications will occur to those skilled in the art.

TABLE II

| Carbonyl Compound Condensed with Malononitrile | Agent Reacted with Resulting Ylidenemalononitrile (1) | Monosubstituted Malononitrile | 1,4-Disubstituted 2-Butenehexacarbonitrile from Reaction with Dichlorofumaronitrile | 4-Substituted 1,1,2,3,4,4-Hexacyano-2-butene Obtained on Heating (2) |
|---|---|---|---|---|
| Stearaldehyde | Hydrogen | Stearylmalononitrile | 1,4-distearyl-2-butenehexacarbonitrile | 4-stearyl-1,1,2,3,4,4-hexacyano-2-butene; (1,1,2,3,4,4-hexacyano-2-docosene). |
| α-Naphthaldehyde | Benzylmagnesium bromide. | α-Naphthyl-β-phenylethyl-malononitrile. | 1,4-bis(α-naphthyl-β-phenylethyl)-2-butenehexacarbonitrile. | 4-(α-naphthyl-β-phenylethyl)-1,1,2,3,4,4-hexacyano-2-butene. |
| 9-anthraldehyde | Methylmagnesium bromide. | α-(9-anthryl)ethyl-malononitrile. | 1,4-bis[α-(9-anthryl)ethyl]-2-butenehexacarbonitrile. | 4-[α-(9-anthryl)ethyl]-1,1,2,3,4,4-hexacyano-2-butene. |
| Benzo[a]pyrene-5-aldehyde | do | α-(5-benzo[a]pyrenyl)-ethylmalononitrile. | 1,4-bis[α-(5-benzo-[a]pyrenyl)-ethyl]-2-butenehexacarbonitrile. | 4-(α-(5-benzo-[a]pyrenyl)ethyl)-1,1,2,3,4,4-hexacyano-2-butene. |
| 2,4,6-octatrienal | Benzylmagnesium bromide. | 1-benzyl-2,4,6-octatrienylmalononitrile. | 1,4-bis(1-benzyl-2,4,6-octatrienyl)-2-butenehexacarbonitrile | 4-(1-benzyl-2,4,6-octatrienyl)-1,1,2,3,4,4-hexacyano-2-butene. |
| Propargyl aldehyde | Methylmagnesium bromide. | 1-methyl-2-propynyl-malononitrile. | 1,4-bis(1-methyl-2-propynyl)-2-butenehexacarbonitrile. | 4-(1-methyl-2-propynyl)-1,1,2,3,4,4-hexacyano-2-butene. |
| 2-heptynal | do | 1-methyl-2-heptynyl-malononitrile. | 1,4-bis(1-methyl-2-heptynyl)-2-butenehexacarbonitrile. | 4-(1-methyl-2-heptynyl)-1,1,2,3,4,4-hexacyano-2-butene. |
| Trifluoroacetaldehyde | Benzylmagnesium bromide. | 2-phenyl-1-trifluoromethylethylmalononitrile. | 1,4-bis(2-phenyl-1-trifluoromethylethyl)-2-butenehexacarbonitrile. | 4-(2-phenyl-1-trifluoromethylethyl)-1,1,2,3,4,4-hexacyano-2-butene. |
| Tribromoacetaldehyde | Methylmagnesium bromide. | 1-methyl-2,2,2-trifluoroethylmalononitrile. | 1,4-bis(1-methyl-2,2,2-trifluoroethyl)-2-butenehexacarbonitrile. | 4-(1-methyl-2,2,2-trifluoroethyl)-1,1,2,3,4,4-hexacyano-2-butene. |
| p-Iodobenzaldehyde | do | α-Methyl-p-iodobenzyl-malononitrile. | 1,4-bis(α-methyl-p-iodobenzyl)-2-butenehexacarbonitrile. | 4-(α-methyl-p-iodobenzyl)-1,1,2,3,4,4-hexacyano-2-butene. |
| 5-hydroxypentanal | Hydrogen | 5-hydroxypenthylmalononitrile. | 1,4-bis(5-hydroxypenthyl)-2-butenehexacarbonitrile. | 4-(5-hydroxypentyl)-1,1,2,3,4,4-hexacyano-2-butene. |
| Glyceraldehyde | Benzylmagnesium bromide. | 1-benzyl-2,3-dihydroxypropyl-malononitrile. | 1,4-bis(1-benzyl-2,3-dihydroxypropyl)-2-butenehexacarbonitrile. | 4-(1-benzyl-2,3-dihydroxypropyl)-1,1,2,3,4,4-hexacyano-2-butene. |
| Salicylaldehyde | Methylmagnesium bromide. | o-Hydroxy-α-methylbenzylmalononitrile. | 1,4-bis(o-hydroxy-α-methylbenzyl)-2-butene-hexacarbonitrile. | 4-(o-hydroxy-α-methylbenzyl)-1,1,2,3,4,4-hexacyano-2-butene. |
| 1-naphthol-2-aldehyde | Ethylmagnesium bromide. | 1-(1-hydroxy-2-naphthyl)propylmalononitrile. | 1,4-bis[1-(1-hydroxy-2-naphthyl)propyl]-2-butenehexacarbonitrile. | 4-[1-(1-hydroxy-2-naphthyl)propyl]-1,1,2,3,4,4-hexacyano-2-butene. |
| Methoxyacetaldehyde | Benzylmagnesium bromide. | 1-benzyl-2-methoxyethyl-malononitrile. | 1,4-bis(1-benzyl-2-methoxyethyl)-2-butene-hexacarbonitrile. | 4-(1-benzyl-2-methoxyethyl)-1,1,2,3,4,4-hexacyano-2-butene. |
| 2-methyl-2,3-dimethoxypentanal. | Methylmagnesium bromide. | 2,3-dimethoxy-1,2-dimethyl-pentylmalononitrile. | 1,4-bis(2,3-dimethyl-1,2-dimethylpentyl)-2-butenehexacarbonitrile. | 4-(2,3-dimethoxy-1,2-dimethylpentyl)-1,1,2,3,4,4-hexacyano-2-butene. |

See footnotes at end of table.

TABLE II—Continued

| Carbonyl Compound Condensed with Malononitrile | Agent Reacted with Resulting Ylidenemalononitrile (1) | Monosubstituted Malononitrile | 1,4-Disubstituted 2-Butenehexacarbonitrile from Reaction with Dichlorofumaronitrile | 4-Substituted 1,1,2,3,4,4-Hexacyano-2-butene Obtained on Heating (2) |
|---|---|---|---|---|
| o-Phenoxybenzaldehyde | Methylmagnesium bromide. | o-Phenoxy-α-methylbenzylmalononitrile. | 1,4-bis(o-phenoxy-α-methylbenzyl)-2-butenehexacarbonitrile. | 4-(o-phenoxy-α-methylbenzyl)-1,1,2,3,4,4-hexacyano-2-butene. |
| m-Benzyloxybenzaldehyde | do | m-Benzyloxy-α-methylbenzylmalononitrile. | 1,4-bis(m-benzyloxy-α-methylbenzyl)-2-butenehexacarbonitrile. | 4-(m-benzyloxy-α-methylbenzyl)-1,1,2,3,4,4-hexacyano-2-butene. |
| di-n-Heptadecyl ketone | Hydrogen | 1-heptadecyloctadecylmalononitrile. | 1,4-bis(1-heptadecyloctadecyl)-2-butenehexacarbonitrile. | 4-(1-heptadecyloctadecyl)-1,1,2,3,4,4-hexacyano-2-butene. |
| 5-Tetralone | do | 1,2,3,4-tetrahydro-2-naphthylmalononitrile. | 1,4-bis(1,2,3,4-tetrahydro-2-naphthyl)-2-butenehexacarbonitrile. | 4-(1,2,3,4-tetrahydro-2-naphthyl)-1,1,2,3,4,4-hexacyano-2-butene. |
| Benzophenone | Methylmagnesium bromide. | 1,1-diphenylethylmalononitrile. | 1,4-bis(1,1-diphenylethyl)-2-butenehexacarbonitrile. | 4-(1,1-diphenylethyl)-1,1,2,3,4,4-hexacyano-2-butene. |
| 2-methyl-2,5-heptadiene-4-one. | do | 1-isobutenyl-1-propenylethylmalononitrile. | 1,4-bis(1-isobutenyl-1-propenylethyl)-2-butenehexacarbonitrile. | 4-(1-isobutenyl-1-propenylethyl)-1,1,2,3,4,4-hexacyano-2-butene. |
| 2-cyclohexeneone | Hydrogen | 2-cyclohexenylmalononitrile. | 1,4-bis(2-cyclohexenyl)-2-butenehexacarbonitrile. | 4-(2-cyclohexenyl)-1,1,2,3,4,4-hexacyano-2-butene. |
| p-Iodoacetophenone | do | 1-(p-iodophenyl)ethylmalononitrile. | 1,4-bis[1-(p-iodophenyl)ethyl]-2-butenehexacarbonitrile. | 4-[1-(p-iodophenyl)ethyl]-1,1,2,3,4,4-hexacyano-2-butene. |
| α-Chloro-α-phenylacetone | Phenylmagnesium bromide. | 1-chloro-1,2-diphenyl-2-propylmalononitrile. | 1,4-bis(1-chloro-1,2-diphenyl-2-propyl)-2-butenehexacarbonitrile. | 4-(1-chloro-1,2-diphenyl-2-propyl)-1,1,2,3,4,4-hexacyano-2-butene. |
| 1,1,1-tris(β-cyanoethyl)acetone. | Hydrogen | 1,1,1-tris(β-cyanoethyl)-2-propylmalononitrile. | 1,4-bis[1,1,1-tris(β-cyanoethyl)-2-propyl]-2-butenehexacarbonitrile. | 4-[1,1,1-tris(β-cyanoethyl)-2-propyl]-1,1,2,3,4,4-hexacyano-2-butene. |
| 2-cyanocyclohexanone | do | 2-cyanocyclohexylmalononitrile. | 1,4-bis(2-cyanocyclohexyl)-2-butenehexacarbonitrile. | 4-(2-cyanocyclohexyl)-1,1,2,3,4,4-hexacyano-2-butene. |
| 4,4'-dicyanobenzophenone | Methylmagnesium bromide. | 1,1-di(p-cyanophenyl)ethylmalononitrile. | 1,4-bis[1,1-di(p-cyanophenyl)ethyl]-2-butenenexacarbonitrile. | 4-[1,1-di(p-cyanophenyl)ethyl]-1,1,2,3,4,4-hexacyano-2-butene. |
| 4,4-dimethyl-5-nitro-2-pentanone. | Hydrogen | 4-nitro-1,3,3-trimethylbutyl-malononitrile. | 1,4-bis(4-nitro-1,3,3-trimethylbutyl)-2-butenehexacarbonitrile. | 4-(4-nitro-1,3,3-trimethylbutyl)-1,1,2,3,4,4-hexacyano-2-butene. |
| 2,4-dinitrobenzaldehyde | Methylmagnesium bromide. | 1-(2,4-dinitrophenyl)ethylmalononitrile. | 1,4-bis[1-(2,4-dinitrophenyl)ethyl]-2-butenehexacarbonitrile. | 4-[1-(2,4-dinitrophenyl)ethyl]-1,1,2,3,4,4-hexacyano-2-butene. |
| Sodium salt of acetophenone-ω-sulfonic acid. | Hydrogen | 1-(p-sodiooxysulfonylphenyl)ethylmalononitrile. | 1,4-bis[1-(p-sodiooxysulfonylphenyl)ethyl]-2-butenehexacarbonitrile. | 4-[1-(p-sodiooxysulfonylphenyl)ethyl]-1,1,2,3,4,4-hexacyano-2-butene. |
| Methyl ester of acetophenone-ω-sulfonic acid. | do | 1-(p-methoxysulfonylphenyl)ethylmalononitrile. | 1,4-bis[1-(p-methoxysulfonylphenyl)ethyl]-2-butenehexacarbonitrile. | 4-[1-(p-methoxysulfonylphenyl)ethyl]-1,1,2,3,4,4-hexacyano-2-butene. |
| γ,γ-Dicarbethoxybutyraldehyde. | do | 3,3-di(ethoxycarbonyl)butylmalononitrile. | 1,4-bis[3,3-di(ethoxycarbonyl)butyl]-2-butenehexacarbonitrile. | 4-[3,3-di(ethoxycarbonyl)butyl]-1,1,2,3,4,4-hexacyano-2-butene. |
| 2-ethoxycarbonylcyclopentanone. | do | 2-ethoxycarbonylcyclopentylmalononitrile. | 1,4-bis[2-ethoxycarbonylcyclopentyl]-2-butenehexacarbonitrile. | 4-[2-ethoxycarbonylcyclopentyl]-1,1,2,3,4,4-hexacyano-2-butene. |
| Ethyl-p-acetylbenzoate | do | 1-(p-ethoxycarbonylphenyl)ethylmalononitrile. | 1,4-bis[1-(p-ethoxycarbonylphenyl)ethyl]-2-butenehexacarbonitrile. | 4-[1-(p-ethoxycarbonylphenyl)ethyl]-1,1,2,3,4,4-hexacyano-2-butene. |
| 5-methyl-2-furaldehyde | Methylmagnesium bromide. | 1-(5-methyl-2-furyl)ethylmalononitrile. | 1,4-bis[1-(5-methyl-2-furyl)ethyl]-2-butenehexacarbonitrile. | 4-[1-(5-methyl-2-furyl)ethyl]-1,1,2,3,4,4-hexacyano-2-butene. |
| 2-formylthiophene | do | α-Methyl-2-thenylmalononitrile. | 1,4-bis[α-methyl-2-thenyl]-2-butenehexacarbonitrile. | 4-[α-methyl-2-thenyl]-1,1,2,3,4,4-hexacyano-2-butene. |
| 2-formylpyridine | do | 1-(2-pyridyl)ethylmalononitrile. | 1,4-bis[1-(2-pyridyl)ethyl]-2-butenehexacarbonitrile. | 4-[1-(2-pyridyl)ethyl]-1,1,2,3,4,4-hexacyano-2-butene. |
| 5-formyl-2-methoxycarbonyl-3-methylbenzofuran. | do | 1-(2-methoxycarbonyl-3-methylbenzofuran-5-yl)ethylmalononitrile. | 1,4-bis[1-(2-methoxycarbonyl-3-methylbenzofuran-5-yl)ethyl]-2-butenehexacarbonitrile. | 4-[1-(2-methoxycarbonyl-3-methylbenzofuran-5-yl)ethyl]-1,1,2,3,4,4-hexacyano-2-butene. |
| 5-methoxycarbonyl-2-furaldehyde. | Benzylmagnesium bromide. | 1-(5-methoxycarbonyl-2-furyl)-2-phenylethylmalononitrile. | 1,4-bis[1-(5-methoxycarbonyl-2-furyl)-2-phenylethyl]-2-butenehexacarbonitrile. | 4-[1-(5-methoxycarbonyl-2-furyl)-2-phenylethyl]-1,1,2,3,4,4-hexacyano-2-butene. |
| 2-methoxycarbonyl-7(6)-formyl-1-methylnaphtho[2,1-b]furan. | Methylmagnesium bromide. | 1-(2-methoxycarbonyl-1-methylnaphtho[2,1-b]furan-7(6)-yl)ethylmalononitrile. | 1,4-bis[1-(2-methoxycarbonyl-1-methylnaphtho[2,1-b]furan-7(6)yl)ethyl]-2-butenehexacarbonitrile. | 4-[1-(2-methoxycarbonyl-1-methylnaphtho[2,1-b]furan-7(6)yl)ethyl]-1,1,2,3,4,4-hexacyano-2-butene. |
| 2-methoxycarbonyl-5-formyl-3-methyl-1-benzothiophene. | do | 1-(2-methoxycarbonyl-3-methyl-1-benzothien-5-yl)ethylmalononitrile. | 1,4-bis[1-(2-methoxycarbonyl-3-methyl-1-benzothien-5-yl)ethyl]-2-butenehexacarbonitrile. | 4-[1-(2-methoxycarbonyl-3-methyl-1-benzothien-5-yl)ethyl]-1,1,2,3,4,4-hexacyano-2-butene. |
| p-Cyanoacetylphenoxyacetaldehyde. | Hydrogen | 2-(p-cyanoacetylphenoxy)ethylmalononitrile. | 1,4-bis[2-(p-cyanoacetylphenoxy)ethyl]-2-butenehexacarbonitrile. | 4-[2-(p-cyanoacetylphenoxy)ethyl]-1,1,2,3,4,4-hexacyano-2-butene. |
| m-[3-(4-cyanoacetylphenyl)-ureido]benzaldehyde. | Methylmagnesium bromide. | 1-[m-(3-[4-cyanoacetylphenyl]ureido)phenyl]ethylmalononitrile. | 1,4-bis[1-(m-[3-(4-cyanoacetylphenyl)-ureido]phenyl)ethyl]-2-butenehexacarbonitrile. | 4-[1-(m-[3-(4-cyanoacetylphenyl)-ureido]phenyl)ethyl]-1,1,2,3,4,4-hexacyano-2-butene. |
| m-(p-Cyanoacetylbenzamido)-benzaldehyde. | do | 1-[m-(p-cyanoacetylbenzamido)phenyl]ethylmalononitrile. | 1,4-bis[1-(m-[p-cyanoacetylbenzamido]-phenyl)ethyl]-2-butenehexacarbonitrile. | 4-[1-(m-[p-cyanoacetylbenzamido]phenyl)ethyl]-1,1,2,3,4,4-hexacyano-2-butene. |
| indole-3-aldehyde | do | 1-(3-indolyl)ethylmalononitrile. | 1,4-bis[1-(3-indolyl)ethyl]-2-butenehexacarbonitrile. | 4-[1-(3-indolyl)ethyl]-1,1,2,3,4,4-hexacyano-2-butene. |
| 7-formyl-2-methoxycarbonyl-anthracene. | do | 1-(2-methoxycarbonyl-7-anthryl)ethylmalononitrile. | 1,4-bis[1-(2-methoxycarbonyl-7-anthryl)-ethyl]-2-butenehexacarbonitrile. | 4-[1-(2-methoxycarbonyl-7-anthryl)ethyl]-1,1,2,3,4,4-hexacyano-2-butene. |
| p-(3-methoxycarbonyl-pyrazolyl)-benzaldehyde. | do | 1-(p-[3-methoxycarbonylpyrazolyl]phenyl)ethylmalononitrile. | 1,4-bis[1-(p-[3-methoxycarbonylpyrazolyl]-phenyl)ethyl]-2-butenehexacarbonitrile. | 4-[1-(p-[3-methoxycarbonylpyrazolyl]phenyl)ethyl]-1,1,2,3,4,4-hexacyano-2-butene. |
| 5-formyl-2-methoxycarbonylbenzothiazole. | do | 1-(2-methoxycarbonyl-5-benzothiazyl)ethylmalononitrile. | 1,4-bis[1-(2-methoxycarbonyl-5-benzothiazyl)ethyl]-2-butenehexacarbonitrile. | 4-[1-(2-methoxycarbonyl-5-benzothiazyl)ethyl]-1,1,2,3,4,4-hexacyano-2-butene. |
| Benzophenone | Hydrogen | α-Phenylbenzylmalononitrile. | 1,4-bis(α-phenylbenzyl)-2-butenehexacarbonitrile. | 4-(α-phenylbenzyl)-1,1,2,3,4,4-hexacyano-2-butene. |
| α-Naphthophenone | do | α-naphthylbenzylmalononitrile. | 1,4-bis(α-naphthylbenzyl)-2-butenehexacarbonitrile. | 4-(α-naphthylbenzyl)-1,1,2,3,4,4-hexacyano-2-butene. |
| 9-anthraphenone | do | 9-anthrylbenzylmalononitrile. | 1,4-bis(9-anthrylbenzyl)-2-butenehexacarbonitrile. | 4-(9-anthrylbenzyl)-1,1,2,3,4,4-hexacyano-2-butene. |

See footnotes at end of table.

TABLE II—Continued

| Carbonyl Compound Condensed with Malononitrile | Agent Reacted with Resulting Ylidenemalononitrile (1) | Monosubstituted Malononitrile | 1,4-Disubstituted 2-Butenehexacarbonitrile from Reaction with Dichlorofumaronitrile | 4-Substituted 1,1,2,3,4,4-Hexacyano-2-butene Obtained on Heating (2) |
|---|---|---|---|---|
| di-α-Naphthyl ketone | Hydrogen | di-α-Naphthylmethylmalononitrile | 1,4-bis(di-α-naphthylmethyl)-2-butenehexacarbonitrile | 4-(di-α-naphthylmethyl)-1,1,2,3,4,4-hexacyano-2-butene |
| 2-aminobenzophenone | do | α-Phenyl-p-aminobenzylmalononitrile | 1,4-bis(α-phenyl-p-aminobenzyl)-2-butenehexacarbonitrile | 4-(α-phenyl-p-aminobenzyl)-1,1,2,3,4,4-hexacyano-2-butene |
| 4,4'-bis(dimethylamino)benzophenone | do | bis(4-dimethylaminophenyl)methylmalononitrile | 1,4-bis(di[4-dimethylaminophenyl]methyl)-2-butenehexacarbonitrile | 4-(di[4-dimethylaminophenyl]methyl)-1,1,2,3,4,4-hexacyano-2-butene |
| 2,2'-dihydroxybenzophenone | do | bis(2-hydroxyphenyl)methylmalononitrile | 1,4-bis(di[2-hydroxyphenyl]methyl)-2-butenehexacarbonitrile | 4-(di[2-hydroxyphenyl]methyl)-1,1,2,3,4,4-hexacyano-2-butene |
| p-Methoxybenzophenone | do | α-Phenyl-p-methoxybenzylmalononitrile | 1,4-bis(α-phenyl-p-methoxybenzyl)-2-butenehexacarbonitrile | 4-(α-phenyl-p-methoxybenzyl)-1,1,2,3,4,4-hexacyano-2-butene |
| 2,4-dihydroxy-6-methoxybenzophenone | do | α-Phenyl-2,4-dihydroxy-6-methoxybenzylmalononitrile | 1,4-bis(α-phenyl-2,4-dihydroxy-6-methoxybenzyl)-2-butenehexacarbonitrile | 4-(α-phenyl-2,4-dihydroxy-6-methoxybenzyl)-1,1,2,3,4,4-hexacyano-2-butene |
| 4,4'-dimethylbenzophenone | do | bis(p-tolyl)methylmalononitrile | 1,4-bis(di[p-tolyl]methyl)-2-butenehexacarbonitrile | 4-(di[p-tolyl]methyl)-1,1,2,3,4,4-hexacyano-2-butene |
| o-Nitrobenzophenone | do | α-Phenyl-o-nitrobenzylmalononitrile | 1,4-bis(α-phenyl-o-nitrobenzyl)-2-butenehexacarbonitrile | 4-(α-phenyl-o-nitrobenzyl)-1,1,2,3,4,4-hexacyano-2-butene |
| p-Nitrobenzophenone | do | α-Phenyl-p-nitrobenzylmalononitrile | 1,4-bis(α-phenyl-p-nitrobenzyl)-2-butenehexacarbonitrile | 4-(α-phenyl-p-nitrobenzyl)-1,1,2,3,4,4-hexacyano-2-butene |
| p,p'-Benzophenonedicarboxylic acid | do | bis(p-Carboxyphenyl)methylmalononitrile | 1,4-bis(di[p-carboxyphenyl]methyl)-2-butenehexacarbonitrile | 4-(di[p-carboxyphenyl]methyl)-1,1,2,3,4,4-hexacyano-2-butene |
| Diethyl ester of p,p'-benzophenonedicarboxylic acid | do | bis(p-Ethoxycarbonylphenyl)methylmalononitrile | 1,4-bis(di[p-ethoxycarbonylphenyl]methyl)-2-butenehexacarbonitrile | 4-(di[p-ethoxycarbonylphenyl]methyl)-1,1,2,3,4,4-hexacyano-2-butene |
| 2-benzoylphenanthrene | do | α-(2-phenanthryl)benzylmalononitrile | 1,4-bis(α-[2-phenanthryl]benzyl)-2-butenehexacarbonitrile | 4-(α[2-phenanthryl]benzyl)-1,1,2,3,4,4-hexacyano-2-butene |
| o-Chlorobenzophenone | do | α-Phenyl-o-chlorobenzylmalononitrile | 1,4-bis(α-phenyl-o-chlorobenzyl)-2-butenehexacarbonitrile | 4-(α-phenyl-o-chlorobenzyl)-1,1,2,3,4,4-hexacyano-2-butene |
| o-Bromobenzophenone | do | α-Phenyl-o-bromobenzylmalononitrile | 1,4-bis(α-phenyl-o-bromobenzyl)-2-butenehexacarbonitrile | 4-(α-phenyl-o-bromobenzyl)-1,1,2,3,4,4-hexacyano-2-butene |
| p-Fluorobenzophenone | do | α-Phenyl-p-fluorobenzylmalononitrile | 1,4-bis(α-phenyl-p-fluorobenzyl)-2-butenehexacarbonitrile | 4-(α-phenyl-p-fluorobenzyl)-1,1,2,3,4,4-hexacyano-2-butene |
| p,p'-Diiodobenzophenone | do | bis(p-Iodophenyl)methylmalononitrile | 1,4-bis(di[p-iodophenyl]methyl)-2-butenehexacarbonitrile | 4-(di[p-iodophenyl]methyl)-1,1,2,3,4,4-hexacyano-2-butene |
| Ethylester of benzophenonesulfonic acid | do | α-Phenyl-p-ethoxysulfonylbenzylmalononitrile | 1,4-bis(α-phenyl-p-ethoxysulfonylbenzyl)-2-butenehexacarbonitrile | 4-(α-phenyl-p-ethoxysulfonylbenzyl)-1,1,2,3,4,4-hexacyano-2-butane |

[1] Other derivatives are readily prepared from each of the carbonyl compounds shown in the first column by treating the ylidenemalononitrile with any of the known Grignard reagents.
[2] The 1-hydrogen of each of these 2-butenes is strongly acidic and the corresponding 2-butenide salts are readily prepared by known methods as previously indicated.

The embodiments of the invention in which an exclusive property or privilege is claimed are defined as follows:

1. A compound selected from the class consisting of

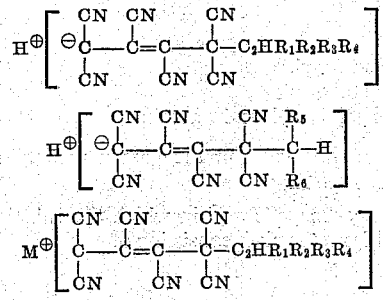

and

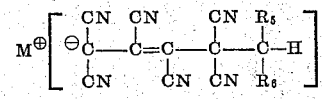

wherein $R_1$, $R_2$, $R_3$ and $R_4$ are selected from the class consisting of hydrogen,
hydrocarbyl of up to 20 carbon atoms, and
substituted hydrocarbyl of up to 20 carbon atoms in which the substituents are selected from the class consisting of amino,
hydroxy,
cyano,
halo,
nitro,
loweralkylsulfonyl,
hydrocarbyloxy, and
loweralkoxycarbonyl;

$R_5$ and $R_6$ are selected from the group consisting of carbocyclic aryl, and
substituted carbocyclic aryl wherein the substituents are selected from the class consisting of amino,
hydroxy,
cyano,
halo,
nitro,
loweralkylsulfonyl,
loweralkoxy, and
loweralkoxycarbonyl; and M is one equivalent of a cation selected from the class consisting of a metal ion having an atomic number selected from the group consisting of atomic number 3, 4, 11–13, 19–32, 37–51, 55–84, and 87–101, inclusive,
an ammonium ion, and
a hydrocarbyl substituted ammonium ion of up to 20 carbon atoms.

2. Compounds of the formula

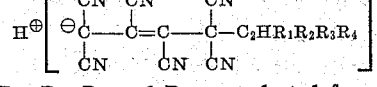

wherein $R_1$, $R_2$, $R_3$ and $R_4$ are selected from the class consisting of hydrogen,
hydrocarbyl of up to 20 carbon atoms, and
substituted hydrocarbyl of up to 20 carbon atoms in which the susbtituents are selected from the class consisting of amino,
hydroxy,
cyano,
halo, nitro,
loweralkylsulfonyl,
hydrocarbyloxy, and
loweralkoxycarbonyl.

3. Compounds of the formula

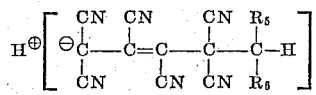

wherein $R_5$ and $R_6$ are selected from the class consisting of carbocyclic aryl, and
substituted carbocyclic aryl in which the substituents are selected from the class consisting of amino,
hydroxy,
cyano,
halo,
nitro,
loweralkylsulfonyl,
loweralkoxy, and
loweralkoxycarbonyl.

4. Compounds of the formula

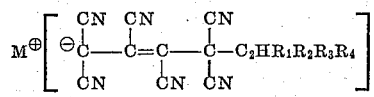

wherein $R_1$, $R_2$, $R_3$ and $R_4$ are selected from the class consisting of hydrogen,
hydrocarbyl of up to 20 carbon atoms, and
substituted hydrocarbyl of up to 20 carbon atoms in which the substituents are selected from the class consisting of amino,
hydroxy,
cyano,
halo,
nitro,
loweralkylsulfonyl,
loweralkoxycarbonyl; and
M is one equivalent of a cation selected from the class consisting of a metal ion having an atomic number selected from the group consisting of atomic number 3, 4, 11–13, 19–32, 37–51, 55–84, and 87–101, inclusive,
an ammonium ion, and
a hydrocarbyl substituted ammonium ion of up to 20 carbon atoms.

5. Compounds of the formula

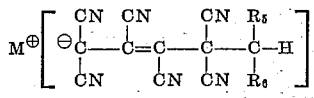

wherein $R_5$ and $R_6$ are selected from the class consisting of
carbocyclic aryl, and
substituted carbocyclic aryl in which the substituents are selected from the class consisting of amino,
hydroxy,
cyano,
halo,
nitro,
loweralkylsulfonyl,
loweralkoxy, and
loweralkoxycarbonyl; and M is one equivalent of a cation selected from the class consisting of
a metal ion having an atomic number selected from the group consisting of atomic number 3, 4, 11–13, 19–32, 37–51, 55–84, and 87–101, inclusive,
an ammonium ion, and
a hydrocarbyl substituted ammonium ion of up to 20 carbon atoms.

6. Tetramethylammonium 1,1,2,3,4,4 - hexacyano - 5-benzyl-5-methyl-2-hexenide.

7. Tetramethylammonium 1,1,2,3,4,4-hexacyano-5,5-dimethyl-2-hexenide.

8. Tetraethylammonium 1,1,2,3,4,4 - hexacyano - 5,5-dimethyl-2-hexenide.

9. Tetramethylammonium 1,1,2,3,4,4 - hexacyano - 5-phenyl-2-hexenide.

10. Tetramethylammonium 1,1,2,3,4,4 - hexacyano - 5-methyl-5-phenyl-2-hexenide.

11. 1,1,2,3,4,4-hexacyano-6-phenyl-2-hexene.

12. 1,1,2,3,4,4-hexacyano-6-methyl-2-heptene.

13. Process for preparing 4-substituted 1,1,2,3,4,4-hexacyanobutene acids which comprises heating a 1,4-disubstituted 2-butenehexacarbonitrile selected from the class consisting of

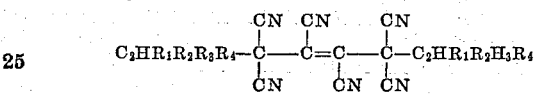

and

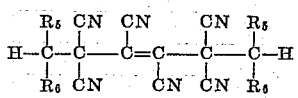

wherein $R_1$, $R_2$, $R_3$ and $R_4$ are selected from the class consisting of hydrogen,
hydrocarbyl of up to 20 carbon atoms, and
substituted hydrocarbyl of up to 20 carbon atoms in which the substituents are selected from the class consisting of amino,
hydroxy,
cyano,
halo,
nitro,
loweralkylsulfonyl,
hydrocarbyloxy, and
loweralkoxycarbonyl, and wherein $R_5$ and $R_6$ are selected from the class consisting of carbocyclic aryl, and
substituted carbocyclic aryl in which the substituents are selected from the class consisting of amino,
hydroxy,
cyano,
halo,
nitro,
loweralkylsulfonyl,
loweralkoxy, and
loweralkoxycarbonyl,
at a temperature of from $-80°$ C. to $+250°$ C., and isolating the resulting product.

14. Process for preparing 4-substituted-1,1,2,3,4,4-hexacyanobutenides which comprises reacting a compound selected from the group consisting of

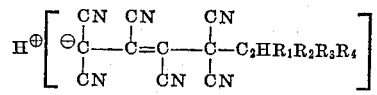

and

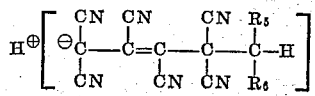

wherein $R_1$, $R_2$, $R_3$ and $R_4$ are selected from the class consisting of hydrogen,
hydrocarbyl of up to 20 carbon atoms, and
substituted hydrocarbyl of up to 20 carbon atoms in which the substituents are selected from the class consisting of amino,
hydroxy,
cyano,
halo,
nitro,
loweralkylsulfonyl,
hydrocarbyloxy, and
loweralkoxycarbonyl; and wherein $R_5$ and $R_6$ are selected from the class consisting of carbocyclic aryl, and
substituted carbocyclic aryl in which the substituents are selected from the class consisting of amino,
hydroxy,
cyano,
halo,
nitro,
loweralkylsulfonyl,
loweralkoxy, and
loweralkoxycarbonyl,
with a compound selected from the class consisting of an oxide, and hydroxide wherein the cation is selected from the class consisting of a metal ion having an atomic number selected from the group consisting of atomic number 3, 4, 11–13, 19–32, 37–51, 55–84, and 87–101, inclusive,
an ammonium ion, and
a hydrocarbyl substituted ammonium ion of up to 20 carbon atoms.

at a temperature of from 0° C. to 100° C., and isolating the resulting product.

References Cited in the file of this patent
UNITED STATES PATENTS 2,766,243    Middleton  ---------------  Oct. 9, 1956